US006433937B1

(12) United States Patent
Konno

(10) Patent No.: US 6,433,937 B1
(45) Date of Patent: Aug. 13, 2002

(54) OPTICAL SYSTEM

(75) Inventor: Mitsujiro Konno, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/524,552

(22) Filed: Mar. 13, 2000

(30) Foreign Application Priority Data

Mar. 15, 1999 (JP) .......................................... 11-068018

(51) Int. Cl.$^7$ ............................................... G02B 15/14
(52) U.S. Cl. ...................... 359/682; 359/684; 359/685; 359/689; 359/740; 359/784
(58) Field of Search ................................ 359/684, 685, 359/689, 740, 682, 784

(56) References Cited

U.S. PATENT DOCUMENTS

| | | | |
|---|---|---|---|
| 4,042,298 A | 8/1977 | Yamasita et al. | ............ 359/735 |
| 4,059,344 A | 11/1977 | Yamasita | ..................... 359/783 |
| 4,312,572 A | 1/1982 | Yamashita et al. | ........... 359/676 |
| 4,764,001 A | 8/1988 | Yokota | ......................... 359/740 |
| 4,854,680 A * | 8/1989 | Kikuchi | ....................... 359/689 |
| 4,976,522 A | 12/1990 | Igarashi | ....................... 359/680 |
| 5,214,538 A * | 5/1993 | Lobb | ........................... 359/691 |
| 5,726,810 A * | 3/1998 | Meyers | ........................ 359/684 |
| 5,764,421 A * | 6/1998 | Shimizu et al. | .............. 359/689 |
| 5,886,829 A * | 3/1999 | Goosey, Jr. | .................. 359/679 |
| 5,999,330 A * | 12/1999 | Goosey, Jr. | .................. 359/689 |
| 6,011,660 A * | 1/2000 | Nagahara | .................... 359/708 |
| 6,075,658 A * | 6/2000 | Nagahara | .................... 359/740 |
| 6,327,100 B1 * | 12/2001 | Yamanashi | ................... 359/683 |

FOREIGN PATENT DOCUMENTS

JP 04-218012 A 8/1992

* cited by examiner

*Primary Examiner*—Evelyn A Lester
(74) *Attorney, Agent, or Firm*—Pillsbury Winthrop LLP

(57) ABSTRACT

An optical system includes a first lens unit, a second lens unit, and a third lens unit. The second lens unit is movable. By moving the second lens unit, astigmatism due to the first lens unit and the second lens unit is corrected and astigmatism due to the second lens unit and the third lens unit is corrected.

10 Claims, 24 Drawing Sheets

SHORT STROKE

LONG STROKE

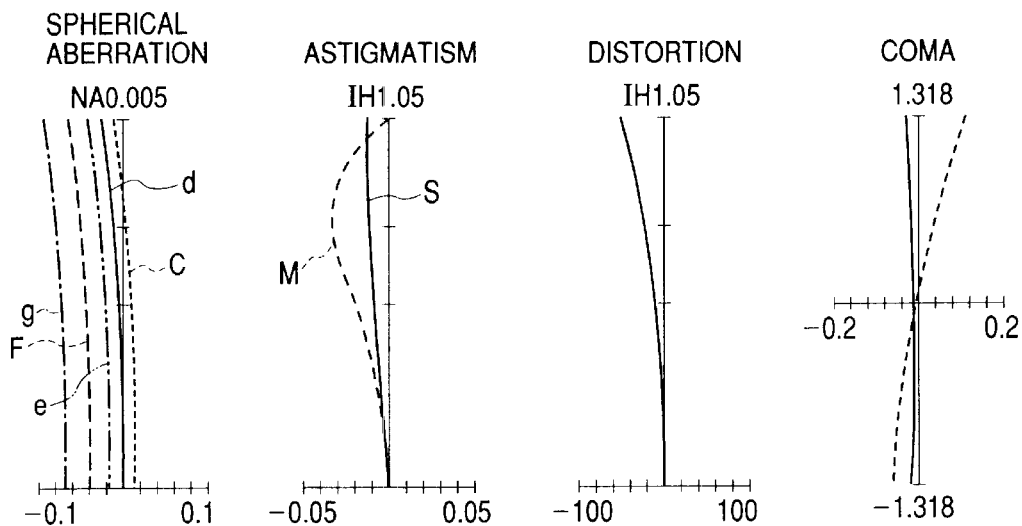
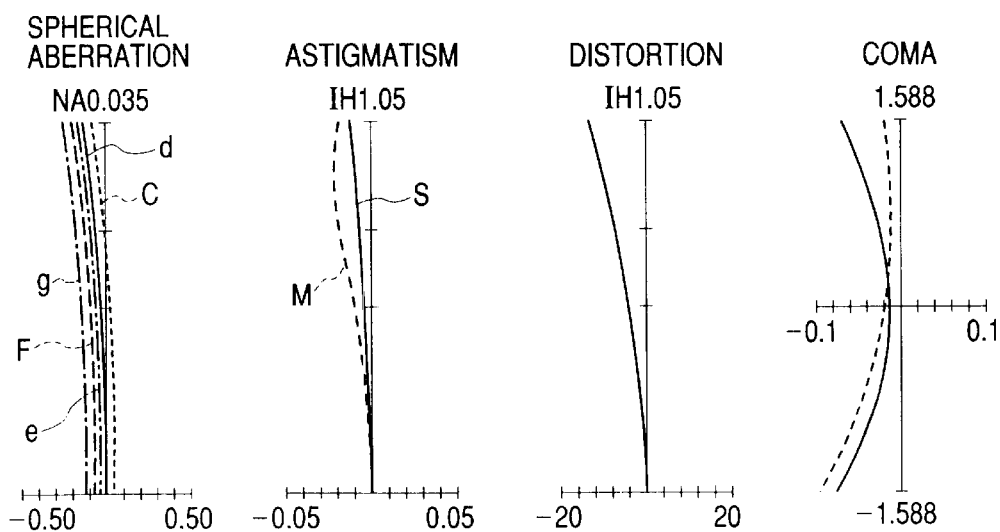

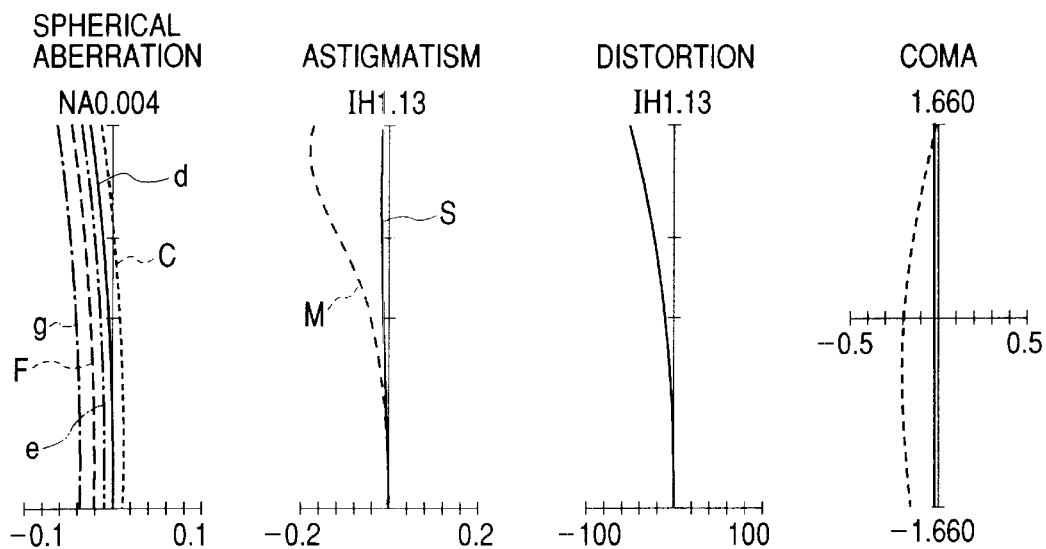
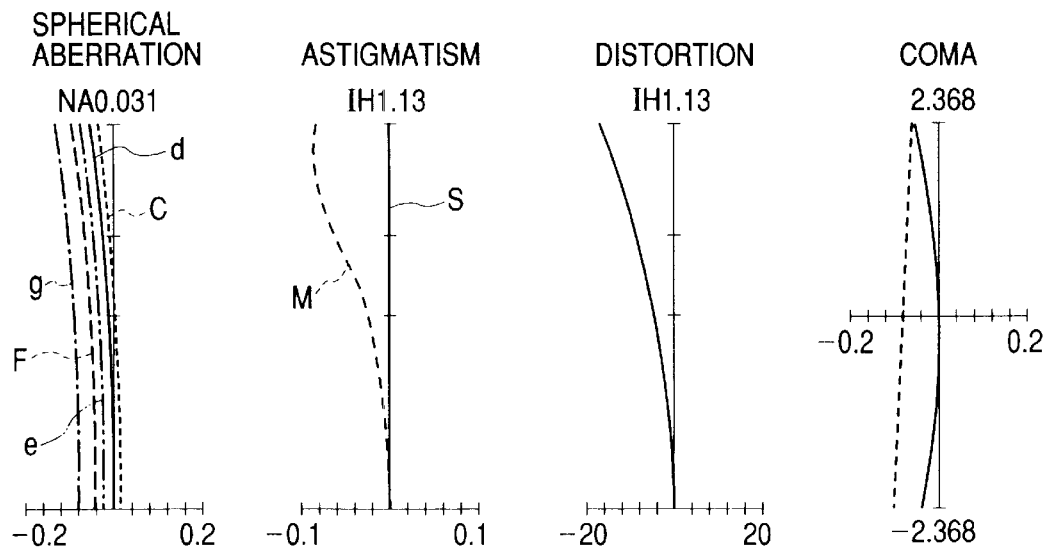

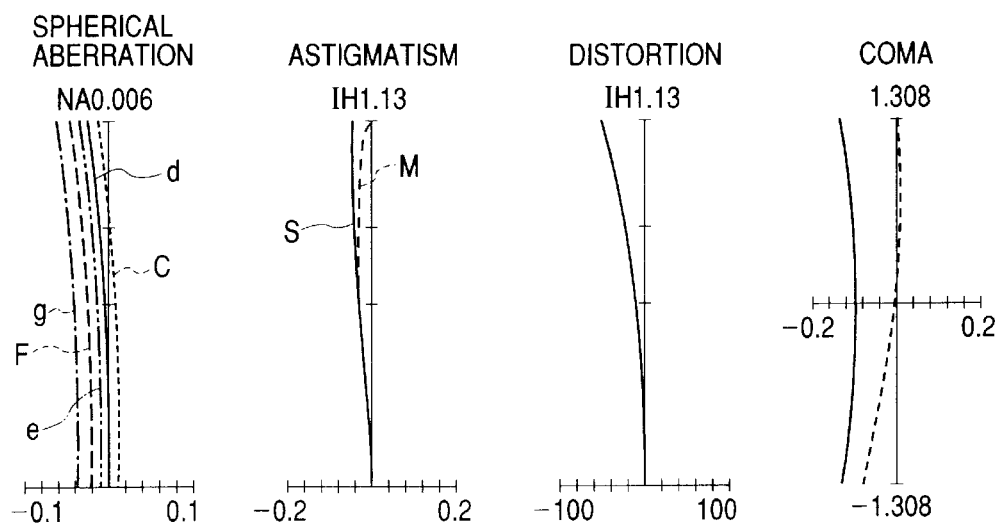
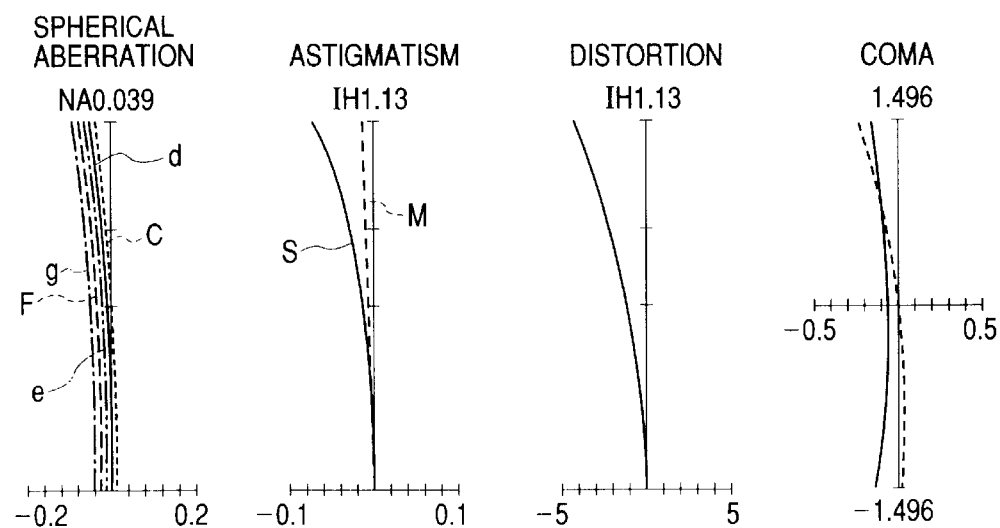

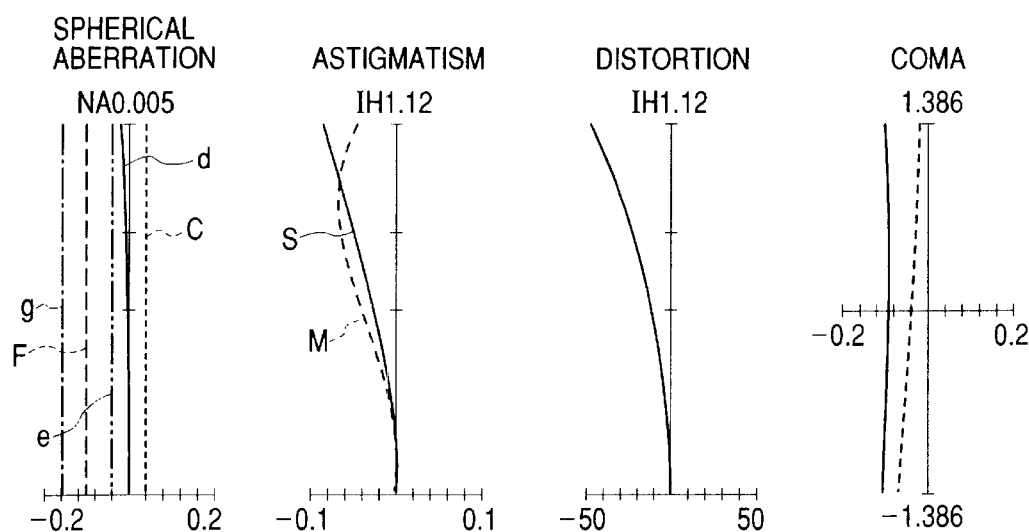
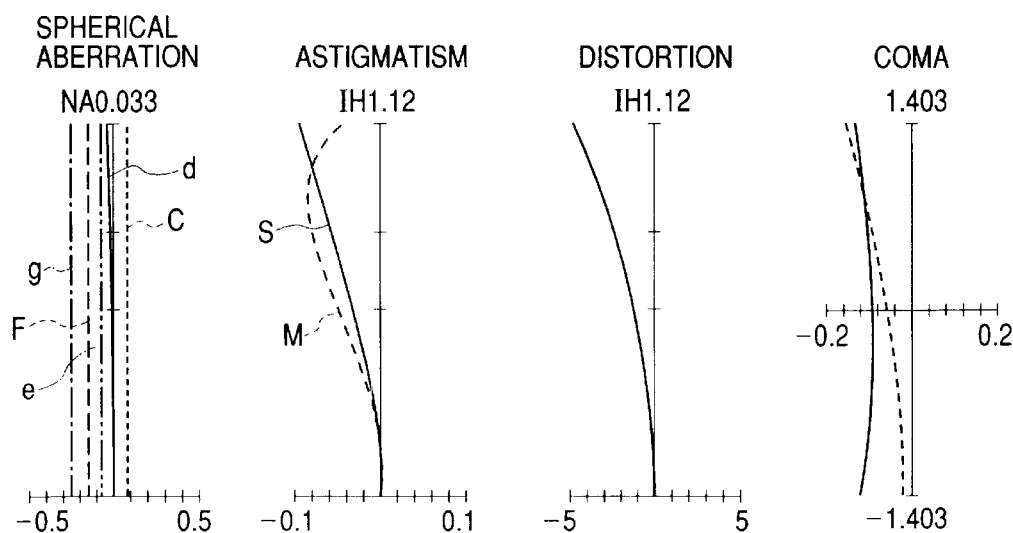

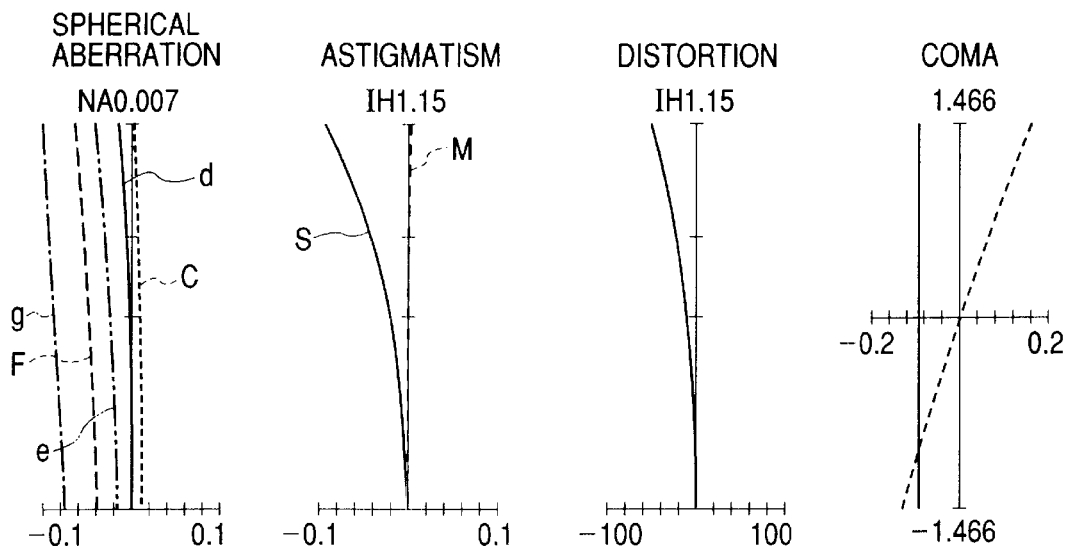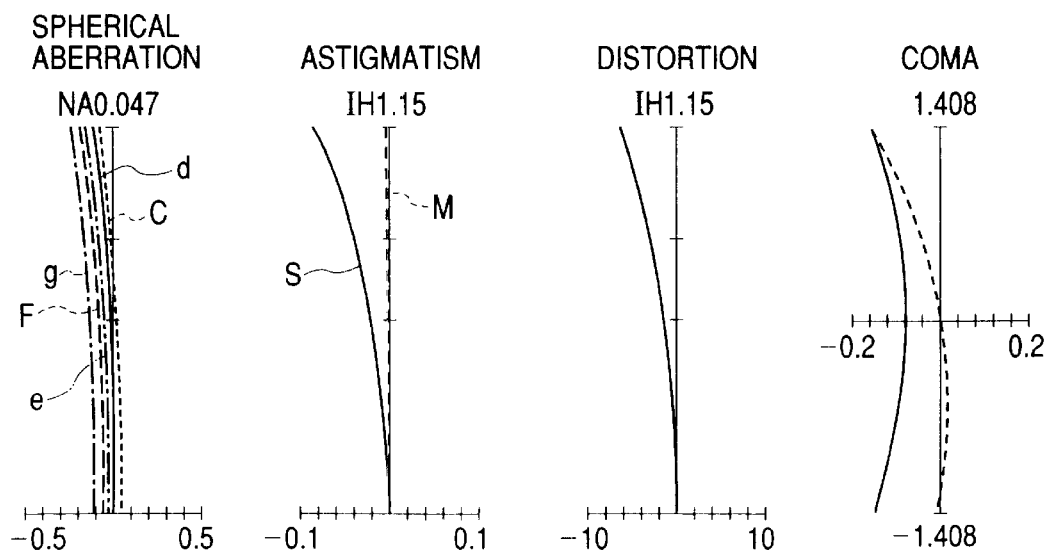

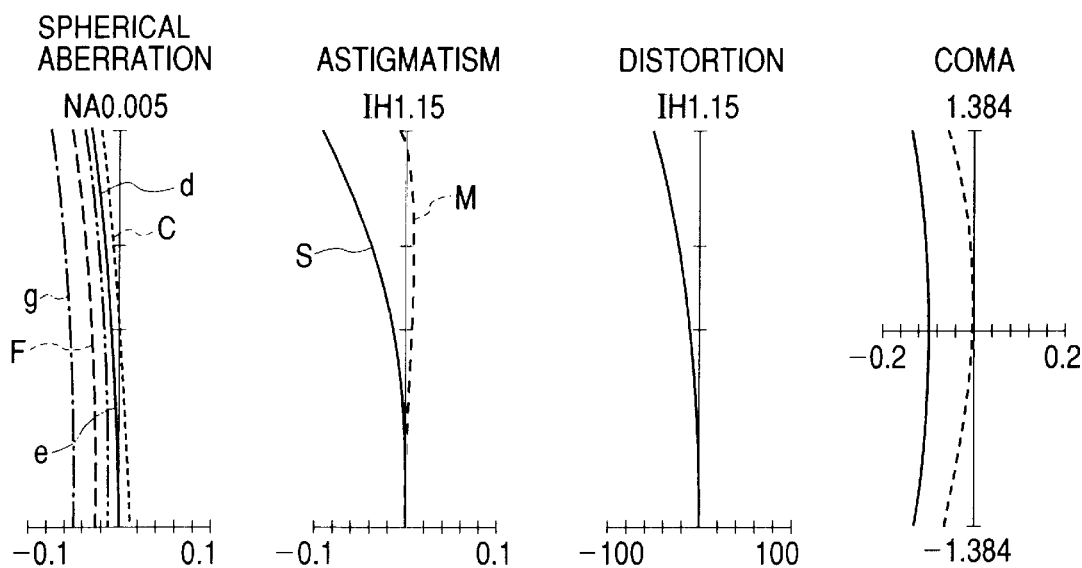
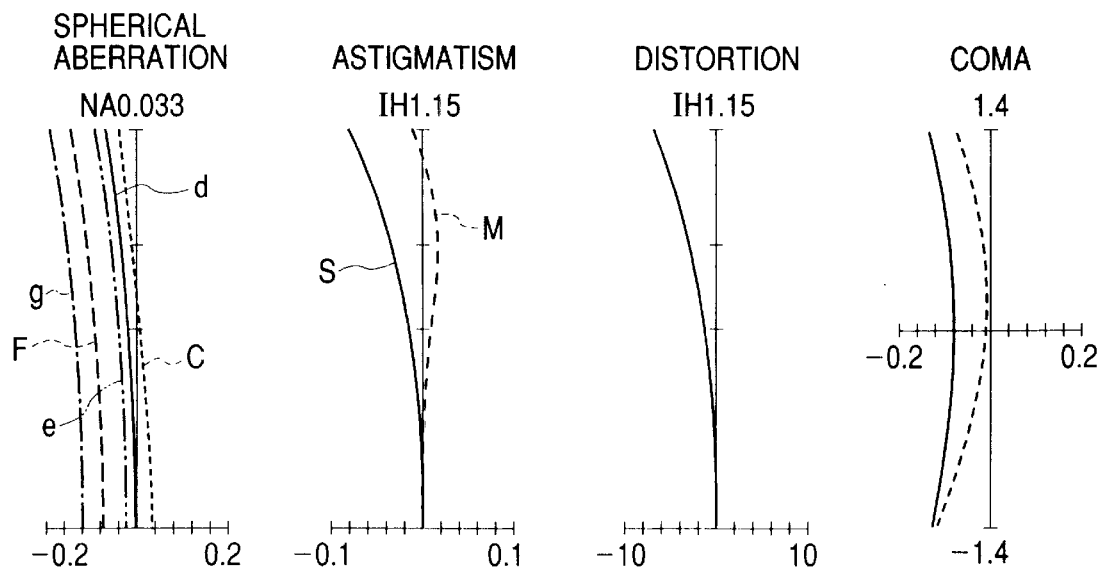

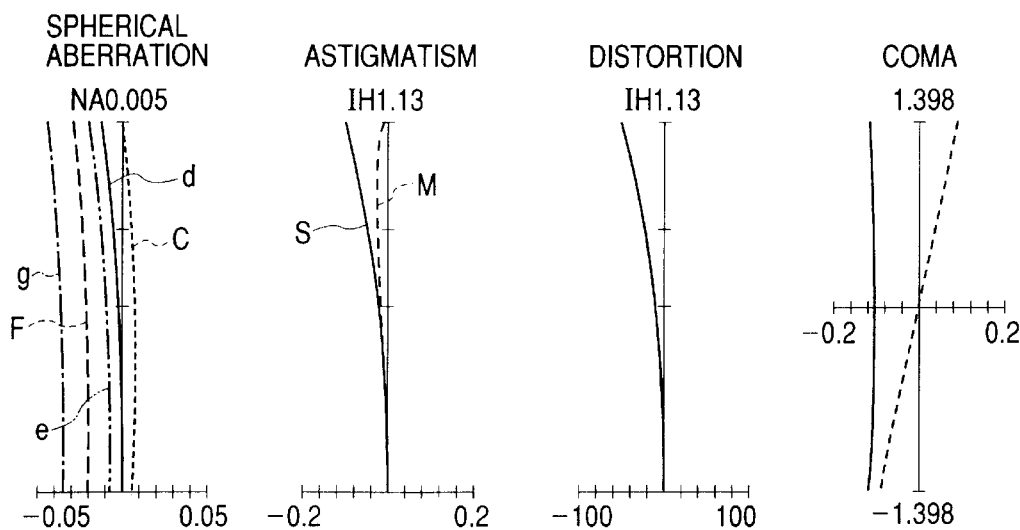
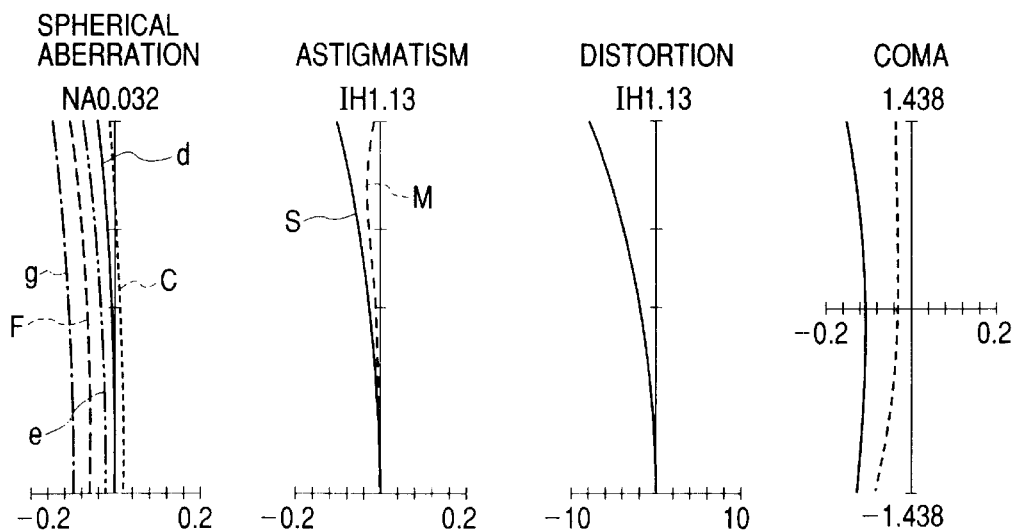

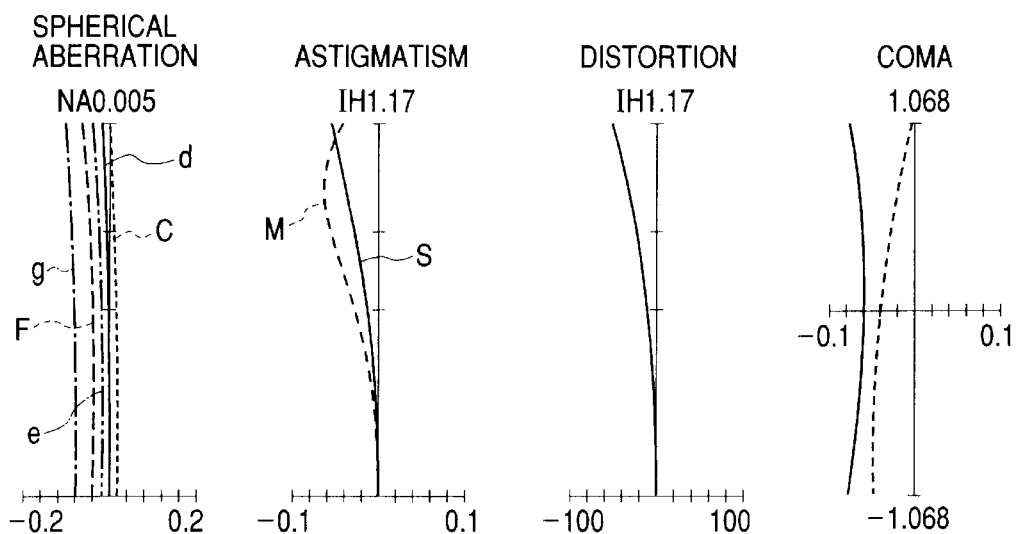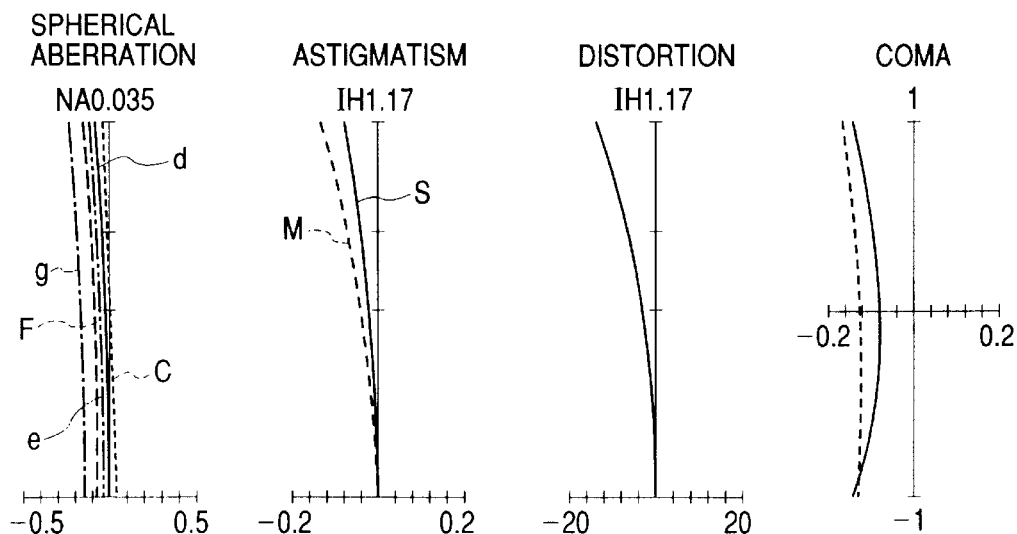

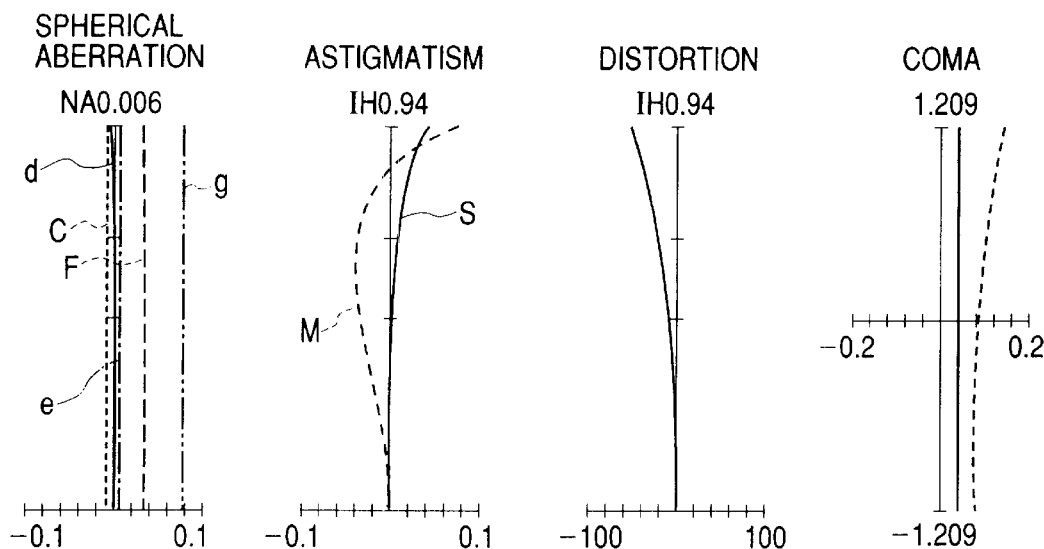
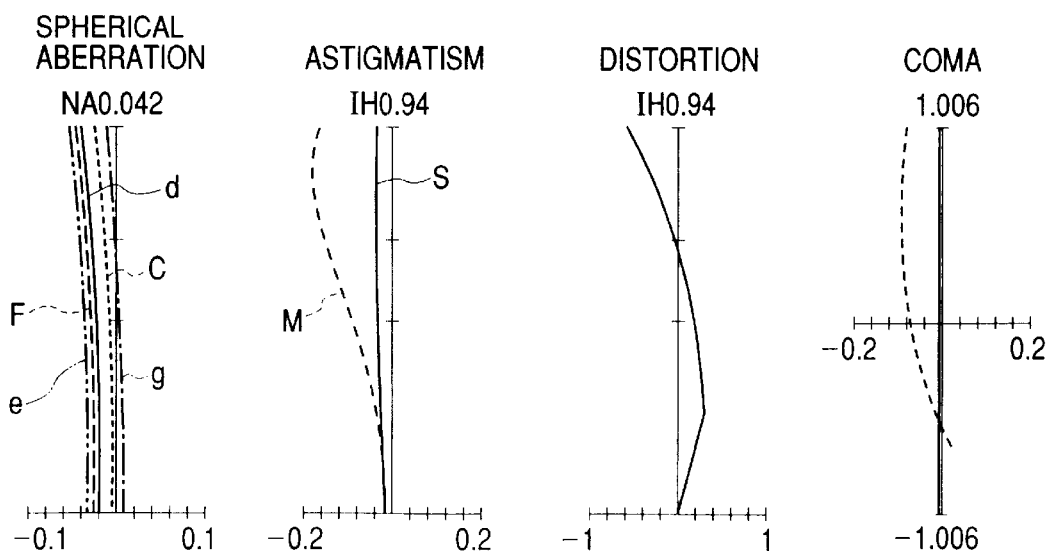

FLARE LIGHT

OPTICAL SYSTEM

BACKGROUND OF THE INVENTION

1. Field of the Invention

This invention relates to an optical system which, in particular, magnifies an image while changing an object distance in an imaging optical system using a solid-state image sensor.

2. Description of Related Art

In recent years, an electronic endoscope using a small-sized CCD (solid-state image sensor) has come into prominent use. According to this endoscope, a diseased part in a human body can be observed through a TV monitor by many people, and thus observations and diagnoses by a plurality of doctors are possible. Moreover, there is the great advantage that a patient is examined while viewing his diseased part. Of such endoscopes, special attention is devoted to a so-called nearby-object observable endoscope which is used for the purpose of closely viewing the diseased part and observing its microstructure to diagnose the extent of penetration of a minute diseased part or possible cutting areas. Some of optical systems for nearby-object observable endoscopes are disclosed, for example, in Japanese Patent Publication No. Sho 61-44283 and Japanese Patent Preliminary Publication No. Hei 4-218012. Each of these optical systems, which are the magnifying optical systems of three-lens-unit type and four-lens-unit type, can bring about a high observation magnification, but has the problem that the entire length of the optical system is considerable and a great burden is imposed on a patient.

In contrast to this, each of optical systems disclosed in Japanese Patent Publication No. Sho 55-15004 and Japanese Patent Preliminary Publication No. Hei 1-279219 is such that the entire length of an optical system is reduced by using the optical system of two-lens-unit type. Such an optical system, however, has the drawback that a working distance (which is hereinafter abbreviated to WD) where a nearby object is observed is long and a sufficiently high magnification is not obtained. There is also the drawback that a field angle 2w in the observation of an object located at a long distance (which is hereinafter referred to as the distant-object observation) is as small as 100° or less and thus much time is required to find a diseased part. In a single-focus endoscope for screening that has no function of the observation of an object located at a short distance (which is hereinafter referred to as the nearby-object observation), the field angle 2w is about 130°, and hence it is desirable to have a wide field angle of the same extent as this.

The optical system of two-lens-unit type facilitates a reduction in the entire length, but when a converging lens unit is moved along the optical axis, ray heights in the distant- and nearby-object observations fluctuate considerably, and thus it becomes difficult to suppress the fluctuation of astigmatism. Hence, in accordance with the movement of the converging lens unit, a meridional image surface changes largely.

In FIG. 1A, reference numeral 1 represents a ray in the distant-object observation and 2 represents a ray in the nearby-object observation. As seen from this figure, the ray 1 passes through high positions of a first diverging lens unit $L_1$ and a second converging lens unit $L_2$. In this state of the ray 1, if powers of the first diverging lens unit $L_1$ and the second converging lens unit $L_2$ are balanced to reduce the production of astigmatism to zero, the function of the first diverging lens unit $L_1$ will be impaired and astigmatism will be undercorrected when the ray height is lowered by the ray 2. That is, with the conventional optical system of two-lens-unit type, the stroke of the movement of the converging lens unit cannot be increased due to correction for astigmatism. In this way, it becomes difficult to reduce the WD in the nearby-object observation to increase the magnification of the optical system.

The short stroke of the movement of the converging lens unit is also related with the fact that a field angle in the distant-object observation cannot be increased. It is for this reason that the size of the field angle in the distant-object observation has a correlation with that in the nearby-object observation, and when the field angle in the distant-object observation is increased, the magnification of the optical system in the nearby-object observation is decreased, but when the amount of stroke is small, a reduction of magnification in the nearby-object observation cannot be obviated.

SUMMARY OF THE INVENTION

It is, therefore, an object of the present invention to provide an optical system for nearby-object observable endoscopes which is reduced in the entire lent and has a wide field angle as in a single-focus endoscope for screening and at the same time, has a high magnification in the nearby-object observation.

In order to achieve this object, the optical system for endoscopes includes, in order from the object side, a first lens unit, a second lens unit, and a third lens unit. The second lens unit is movable. This optical system is such that the movement of the second lens unit allows astigmatism due to the first lens unit and the second lens unit to be corrected and astigmatism due to the second lens unit and the third lens unit to be corrected.

Further, the optical system for endoscopes of the present invention includes an image-forming system comprising, in order from the object side, at least, a first diverging lens unit with a negative function, a second converging lens unit with a positive function, and a third diverging lens unit with a negative function. This optical system allows the second converging lens unit to be moved along the optical axis and satisfies the following conditions:

$$-1.3 < \beta_{2T} < \beta_{2W}$$

$$1 < |\beta_{3T}|$$

where $\beta_{2T}$ is the magnification of the second converging lens unit in the nearby-object observation, $\beta_{2W}$ is the magnification of the second converging lens unit in the distant-object observation, and $\beta_{3T}$ is the magnification of the third diverging lens unit in the nearby-object observation.

This and other objects as well as the features and advantages of the present invention will become apparent from the following detailed description of the preferred embodiments when taken in conjunction with the accompanying drawings.

BRIEF DESCRIPTION OF THE DRAWINGS

FIGS. 14A–14D and FIGS. 15A–15D are diagrams showing aberration curves of the first embodiment;

FIGS. 16A–16D and FIGS. 17A–17D are diagrams showing aberration curves of the second embodiment;

FIGS. 18A–18D and FIGS. 19A–19D are diagrams showing aberration curves of the third embodiment;

FIGS. 20A–20D and FIGS. 21A–21D are diagrams showing aberration curves of the fourth embodiment;

FIGS. 22A–22D and FIGS. 23A–23D are diagrams showing aberration curves of the fifth embodiment;

FIGS. 24A–24D and FIGS. 25A–25D are diagrams showing aberration curves of the sixth embodiment;

FIGS. 26A–26D and FIGS. 27A–27D are diagrams showing aberration curves of the seventh embodiment;

FIGS. 28A–28D and FIGS. 29A–29D are diagrams showing aberration curves of the eighth embodiment;

FIGS. 30A–30D and FIGS. 31A–31D are diagrams showing aberration curves of the ninth embodiment;

DETAILED DESCRIPTION OF THE PREFERRED EMBODIMENTS

Figure 1A:
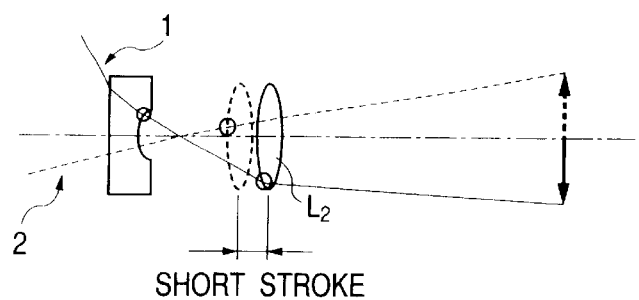
FIG. 1A and FIG. 1B are conceptual views showing optical systems of the prior art and the present invention, respectively.
Figure 1B:
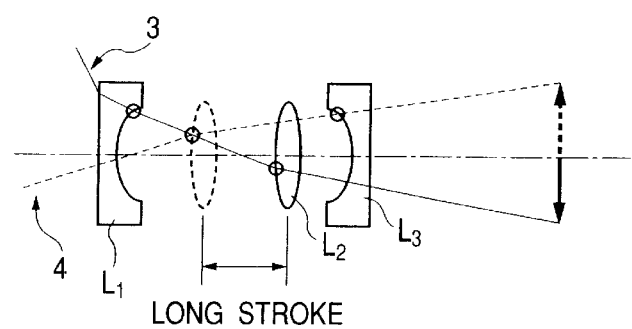

In FIG. 1B, reference numeral 3 denotes a ray in the distant-object observation and 4 denotes a ray in the nearby-object observation. In the present invention; the optical system of two-lens-unit type is improved and a third diverging lens unit $L_3$ is placed on the image side of the second converging lens unit $L_2$.

For the ray 3 in the distant-object observation, the power of the first diverging lens unit $L_1$ and the powers of the second converging lens unit $L_2$ and the third diverging lens unit $L_3$ are balanced, and thus astigmatism is not produced at all. As for the ray 4 in the nearby-object observation, the ray height at the first diverging lens unit $L_1$ becomes low and its negative function is weakened. However, since the negative function of the third diverging lens unit $L_3$ is strengthened by the movement of the second converging lens unit $L_2$, astigmatism is minimized even in the nearby-object observation. In this way, there is no need to devote attention to the fluctuation of aberration caused by the movement of the second converging lens unit $L_2$, and a large amount of stroke can be held. Consequently, the working distance in the nearby-object observation, in contrast with that of the conventional optical system of two-lens-unit type, can be reduced, that is, the magnification of the optical system can be increased. Moreover, because of the amount of stroke sufficient for magnification, the field angle in the distant-object observation can be increased.

In the optical system including three lens units with negative, positive, and negative powers in this order from the object side, what follows is a description of the relationship between the positions of an object point and a focal point where the first and third diverging lens units are fixed and the second converging lens unit is moved, thereby changing a magnification $\beta_2$.

Figure 2A:
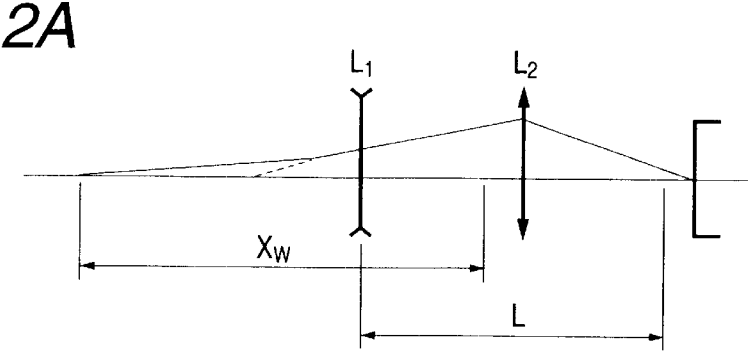
FIG. 2A and FIG. 2B are views for explaining an object distance.
Figure 2B:
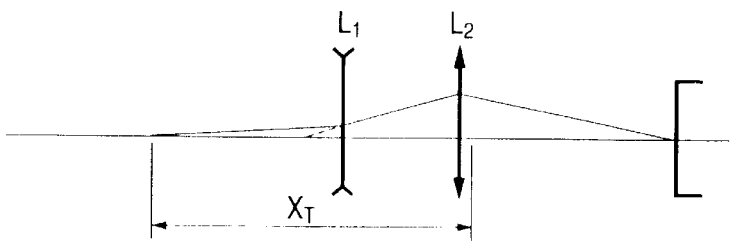

Assuming that an image plane is not shifted by the movement of the second converging lens unit, the object point for the third diverging lens unit is not shifted either. Thus, in the description of the object distance of this optical system, the third diverging lens unit is negligible. In FIGS. 2A and 2B, when the focal length of the entire system is represented by f; focal lengths of the first diverging lens unit $L_1$ and the second converging lens unit $L_2$ are represented by $f_1$ and $f_2$, respectively; the magnification of the second converging lens unit $L_2$ in an infinite-object observation is represented by $\beta_2'$; and a distance from the first diverging lens unit $L_1$ to the position of the back focal point of the second diverging lens unit $L_2$ is represented by L, the focal length f and the distance L are expressed by $$f = f_1 \beta_2' \quad \text{(a)}$$

$$L = f_1 + f_2(2 - \beta_2' - 1/\beta_2') \quad \text{(b)}$$

As is well known, when the second converging lens unit $L_2$ is moved to change the magnification $\beta_2'$, the focal length f is changed according to Equation (a). The position of the focal point is shifted according to Equation (b), and the distance L is reduced to a minimum when $\beta_2' = -1$.

The above description is given on the basis of the object side, and in an actual observation, an image position is fixed. Thus, when the image position is taken as a basis, the object distance that has an imaging relation with the image position is minimized in the case where the magnification $\beta_2'$ of the second converging lens unit $L_2$ relative to a particular image position is −1.

When a distance from the position of the front focal point of the first diverging lens unit $L_1$ relative to any value of the magnification $\beta_2'$ to an object is denoted by x and the distance where $\beta_2' = -1$ is denoted by $x_0$, the distance x is expressed by $$x = \{1/x_0 - f_2 \cdot (2 + \beta_2' + 1/\beta_2')/f_1^2\}^{-1} \quad \text{(c)}$$

Here, the distance x takes a negative sign with respect to the left direction of FIGS. 2A and 2B. Also, the object distance is assumed to hereinafter obey this sign convention.

If the distance x and the magnification $\beta_2'$ are set to particular conditions to fix the image position, it is possible to find the distance x where the second converging lens unit is moved to change the magnification $\beta_2'$. When the distance x at $\beta_2'=\beta_{2W}'$ is taken as $x_W$, Equation (c) can be modified as $$x=\{f_2 \cdot (\beta_{2W}'+1/\beta_{2W}'-\beta_2'-1/\beta_2')/f_1^2+1/x_W\} \qquad \text{(d)}$$

When the distance $x_0$ in this case is taken as $x_{0W}$, the distance $x_{0W}$ can be obtained by $$x_{0W}=\{1/x_W+f_2 \cdot (2+\beta_{2W}'+1/\beta_{2W}')/f_1^2\}^- \qquad \text{(e)}$$

Figure 3:
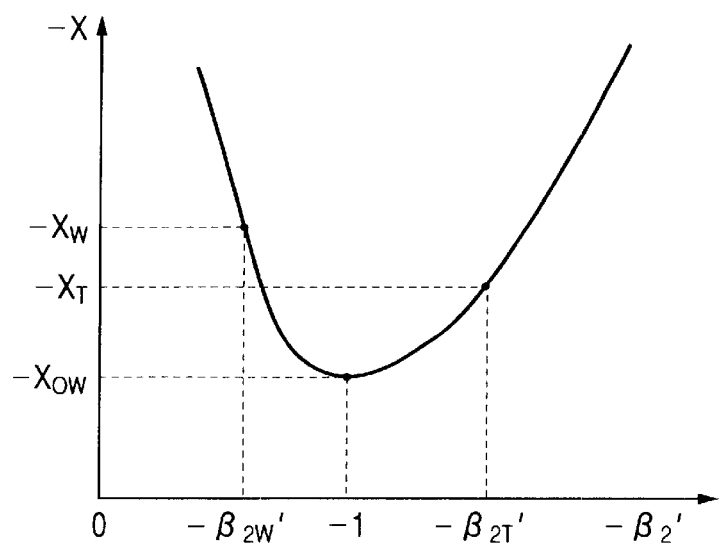
FIG. 3 is a graph showing the relationship between an object distance and a magnification.

FIG. 3 shows a graph representing the relation of Equation (d). In this graph, the axis of ordinates is $-x$ and the axis of abscissas is $-\beta_2'$. From the graph, when a state off $\beta_2'=\beta_{2W}'$ at $x=x_W$ is set, focusing becomes possible in relation to any object point at $x \leq x_{0W}$. For any object point at $x \leq x_{0W}$, the magnification $\beta_2'$ has solutions, one for each of both sides of $\beta_2'=-1$.

Subsequently, reference is made to the ratio between the focal lengths. The magnifications $\beta_2$ and $\beta_2'$ are usually different and their relation is as follows:

$$\beta_2'=\beta_2/(1-f_1/f_2\beta) \qquad \text{(f)}$$

where $\beta$ is a combined magnification of the first diverging lens unit and the second converging lens unit in relation to the object point corresponding to the image position.

If the magnification of the entire system is low enough, Equation (f) can be approximated as $\beta_2' \approx \beta_2$, and Equation (a) becomes $f \approx f_1 \beta_2'$. Thus, a ratio $\gamma$ of the focal length f at any value of the magnification $\beta_2'$ to a focal length $f_W$ at $\beta_2' \approx \beta_{2W}'$, especially in the range in which the magnification of the entire system is not very high, can be thought of as approximately expressed by $$\gamma=f/f_W \approx \beta_2'/\beta_{2W}' \qquad \text{(g)}$$

In FIG. 3, the object point distance and the magnification of the second converging lens unit in a state of a short focal length are taken as $x_W$ and $\beta_{2W}'$, respectively, and the object point distance and the magnification of the second converging lens unit in a state of a long focal length are taken as $x_T$ and $\beta_{2T}'$, respectively. Where the focal lengths $f_1$ and $f_2$ are fixed and the second converging lens unit is moved so that the magnification $\beta_2'$ is changed into two states to alter the focal length, the variation of the distance x to the object is slight because the present invention satisfies the following condition:

$$-1.3<\beta_{2T}<\beta_{2W} \qquad \text{(1)}$$

where $\beta_{2T}$ is the magnification of the second converging lens unit in the nearby-object observation and $\beta_{2W}$ is the magnification of the second converging lens unit in the distant-object observation. In this case, if $\beta_{2W}<\beta_{2T}$, the distance to the object in the case of the long focal length becomes longer than that in the case of the short focal length. Usually, in the short focal length, the object is located at a considerable distance away because an object for observation is examined, while in the long focal length, the nearby-object observation is performed by approaching the object. Hence, it is necessary to satisfy a condition, $\beta_{2T}<\beta_{2W}$.

When the focal length is enlarged from the short focal length to the long focal length, the distance to the object becomes shortest at $\beta_{2T}=-1$. However, when the second converging lens unit is further moved, the distance to the object increases. If the amount of increase of the working distance is small in some extent, there is no problem, but in the limit of $\beta_{2T}<-1.3$, the optical system becomes cumbersome. Thus, in the present invention, a condition, $-1.3<\beta_{2T}$, is added.

In this condition, however, since the ratio of $\gamma=\beta_{2T}'/\beta_{2W}'$ cannot be increased and the magnification is low, there is the need to magnify the object by the third diverging lens unit and increase the magnification of the entire system. Thus, in the present invention, the following condition is added:

$$1<|\beta_{3T}| \qquad \text{(2)}$$

where $\beta_{3T}$ is the magnification of the third diverging lens unit in the nearby-object observation. Since it is the subject of the present invention that the third diverging lens unit is a magnifying system, its magnification must be greater than 1×.

Furthermore, instead of satisfying Condition (2), it is desirable to satisfy the following condition:

$$1.5<|\beta_{3T}| \qquad \text{(2')}$$

The present invention is designed so that the third diverging lens unit has, at least, a concave surface directed toward the object side, and thereby is capable of achieving the object more effectively. An endoscope needs the function that, for example, washes off mucus adhering to its tip with water. However, if the outer surface of the first diverging lens unit is concave, the water stays there and it becomes impossible to make observation. It is thus desirable that the outer surface is planar or convex. The first diverging lens unit, on the other hand, needs a negative power to obtain a wide angle, and therefore must have a concave surface directed toward the image side. When the configuration of the third diverging lens unit is considered so that the first diverging lens unit and the third diverging lens unit are symmetrically located with resect to a stop, this is convenient to suppress the production of astigmatism and coma. Consequently, the optical system can be constructed with a small number of lenses, which is favorable for cost and a reduction in optical path length.

Here, a description is given of a desirable relationship between the concave surfaces of the first diverging lens unit and the third diverging lens unit in this case.

$$1<|R_1/R_3|<3 \qquad \text{(3)}$$

where $R_1$ is the radius of curvature of a concave surface with the smallest radius of curvature, of concave surfaces directed toward the image side in the first diverging lens unit and $R_3$ is the radius of curvature of a concave surface with the smallest radius of curvature, of concave surfaces directed toward the object side in the third diverging lens unit. The radii of curvature $R_1$ and $R_3$ must have a proper relationship for mutual correction for astigmatism. However, if a balanced value is below the lower limit of Condition (3), the radius of curvature $R_1$ becomes unnecessarily small and the back focal distance will be increased, thus causing an increase in the entire length of the optical system. Conversely, beyond the upper limit, the radius of curvature $R_1$ becomes exceedingly large, and correction for astigmatism which is the original aim of the present invention becomes difficult.

Subsequently, reference is made to a favorable condition relative to the focal length of the third diverging lens unit.

$$-5<f_3/f_W<-1 \qquad \text{(4)}$$

where $f_3$ is the focal length of the third diverging lens unit and $f_W$ is a focal length from the first diverging lens unit to the third diverging lens unit in the distant-object observation.

The third diverging lens unit has the concave surface directed toward the object side in order to correct aberration.

It is advantageous for correction for aberration to reduce the radius of curvature of the concave surface as far as possible. However, if the power is strengthened beyond the upper limit of Condition (4), the entire length will be increased and a reduction of the entire length which is the original object will cease to be obtainable. Conversely, if the power is weakened below the lower limit, the range of correction for aberration will be narrowed when the second converging lens unit is moved, and the amount of stroke of the second converging lens unit can no longer be increased. In view of such situation, Condition (4) is defined within a practical tolerance.

The present invention is further designed so that, at least, a surface with a positive function is included in the third diverging lens unit, and thereby is capable of achieving the object more effectively. The third diverging lens unit has a strong concave surface directed toward the object side and the function of magnifying an image formed by the first diverging lens unit and the second converging lens unit. However, it is desirable that the negative power is rather weak for the reason that the back focal distance is not increased and compactness of the entire length is obtained. That is, it is necessary that the positive power is distributed to the third diverging lens unit so that the negative power is offset. The presence of the convex surface is favorable because fine adjustment is facilitated when astigmatism is corrected. In particular, directing the convex surface toward the image side is favorable for correction for aberration.

What follows is a description of a desirable relationship between the configurations of the surface with a negative function and the surface with a positive function in the third diverging lens unit.

$$-0.1 < 0.5 \cdot h_3 \cdot (1/(|r_{31}|+D_3)-1/|r_{32}|) < 0.3 \quad (5)$$

where $h_3$ is the maximum height of a ray passing through the third diverging lens unit, $r_{31}$ is the radius of curvature of the concave surface directed toward the object side in the third diverging lens unit, $r_{32}$ is the radius of curvature of the convex surface directed toward the image side in the third diverging lens unit, and $D_3$ is the thickness of the third diverging lens unit.

As mentioned above, when the positive and negative functions in the third diverging lens unit are balanced, the configuration of a lens which makes a small difference in curvature is obtained. Condition (5) is such that-this lens configuration is conditioned in view of lens making. If the lower limit of Condition (5) is passed, centering of a lens becomes difficult in actual lens making, and a lens yield will be deteriorated, with a resulting increase in cost. Conversely, beyond the upper limit, workability becomes good, but the balance between the positive and negative functions in the third diverging lens unit is disturbed and correction for aberration becomes difficult.

The present invention is still further designed so that an aperture stop is interposed between lenses of the second converging lens unit, and thereby is capable of achieving the object more effectively. The second converging lens unit requires a strong positive power to have an imaging function. The second converging lens unit is thus constructed with a positive lens, an aperture stop, and a positive lens, thereby having a strong positive power as a whole. At the same time, the second converging lens unit is symmetrically arranged with respect to the stop so that the production of astigmatism and coma can be suppressed. Consequently, in this case also, the optical system can be constructed with a small number of lenses, which is favorable for cost and a reduction in optical path length.

A desirable relationship in the second converging lens unit in this case is described below.

$$0.9 < f_2/f_W < 2 \quad (6)$$

The second converging lens unit is the only image-forming system in the optical system of present invention. Thus, the power of the second converging lens unit relative to the total focal length largely contributes to the entire length of the optical system, that is, a length from the first surface of the optical system to the imaging plane thereof. In view of the entire length, it is favorable to reduce the focal length $f_2$ as far as possible. However, below the lower limit of Condition (6), it becomes difficult to suppress the production of spherical aberration. Conversely, beyond the upper limit, an increase in the entire length will be caused. In view of such situation, Condition (6) is defined within a practical tolerance.

In recent years, the design of a high density of pixels and compactness of a CCD have been advanced and the application of the CCD to an endoscope has become considered. The application of such a CCD with a large number of pixels to the nearby-object observable endoscope mentioned above is advantageous for diagnosis because a finer structure of the human body can be observed. However, if the optical system for nearby-object observable endoscopes is applied as it is, the problem will arise that the F-number in the nearby-object observation is large and hence an image is degraded by a diffraction phenomenon. In order to obviate this problem, if the diameter of the stop is increased in design so that the F-number in the nearby-object observation becomes smaller, the F-number in the distant-object (wide) observation also becomes smaller.

For the usage of the endoscope, the distant-object observation corresponds to the case where an operator looks for a minute diseased part, and thus it is desirable to bring all of nearby and distant objects to a focus, namely to have a large F-number and a large depth of field. The present invention also provides an optical system for nearby-object observable endoscopes that solves two opposite problems mentioned above.

In the optical system in which the best focus distance to an object changes, the above problems can be solved by satisfying the following conditions at the same time:

$$2p/(1.22\lambda) < F_T < 4p/(1.22\lambda) \quad (7)$$

$$F_W < F_T \quad (8)$$

where $F_T$ is an effective F-number in the nearby-object observation, $F_W$ is an effective F-number in the distant-object observation, p is the pixel pitch of a CCD, and $\lambda$ is a wavelength on the d line (587 nm).

Figure 4A:
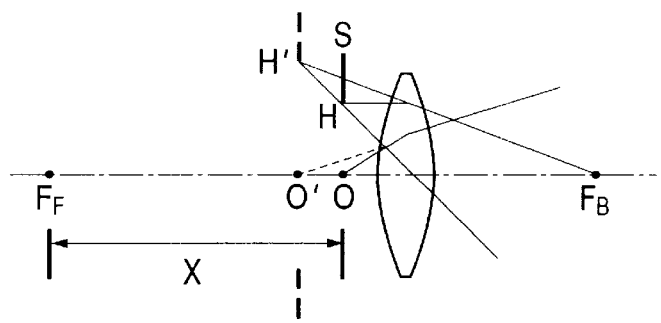
FIG. 4A and FIG. 4B are views showing constructions where a variator is located behind an aperture stop.
Figure 4B:
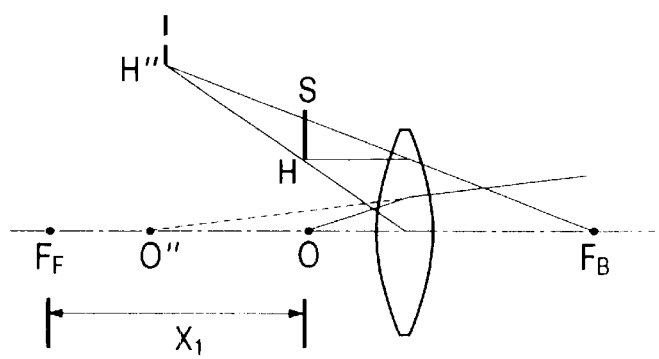

Each of FIGS. 4A and 4B shows a simplified construction where a ray is traced in a reverse direction from the image side when a variator is located behind an aperture stop S. Specifically, FIG. 4A illustrates a case where a distant object is observed, and FIG. 4B illustrates a case where the aperture stop S is also moved at the same time in a magnified-object observation. In FIG. 4A, when the imaging magnification of a pupil is represented by m, the magnification m is expressed by $$m = O'H'/OH = \phi_E/\phi_O = f/|x| \quad (h)$$

where OH is a half of an aperture stop diameter $\phi_O$, O'H' is a half of an entrance pupil diameter $\phi_E$, f is the focal length of the optical system in this figure, and x is a distance from the aperture stop S to a front focal point $F_F$.

Next, when an effective F-number in the magnified-object observation is taken as $F_{T(F)}$ in a case where the aperture stop is fixed and $F_{T(M)}$ in a case where it is moved with the variator, the following equations are established:

$$F_W = f_W/\phi_E \cdot F_{T(F)} = f_T/\phi_E \cdot F_{T(M)} = f_T/\phi_E' \quad (i)$$

where $f_T$ is the focal length of the entire system in the magnified-object observation An imaging magnification m' of the pupil where the aperture stop S is moved as in FIG. 4B is as follows:

$$m' = O''H''/OH = \phi_E/\phi_O = f/|x_1| \quad (j)$$

Because $|x_1| < |x|$, $m < m'$ and $\phi_E < \phi_E'$. Therefore, $F_{T(M)} < F_{T(F)}$.

If $|\beta_{3T}/\beta_{3W}| = n$, the F-number $F_{T(M)}$ is expressed as $$F_{T(M)} = m \cdot n \cdot F_W/m' \quad (k)$$

A variable magnification n is now enough to exceed the fluctuation ratio of an entrance pupil factor and thus, from the above equation, the following relation is established:

$$F_W < F_{T(M)} < F_{T(F)} \quad (m)$$

From this, when the aperture stop is moved with the variator rather than fixed, it is possible to reduce the F-number in the magnified-object observation and to increase the F-number in the distant-object observation.

On the other hand, a resolution limit frequency $f_r$ of the optical system, for example, as a Rayleigh diffraction limit, is given by $$f_r = 1/(1.22 \cdot \lambda \cdot Fno) \text{[lines/mm]} \quad (n)$$

where $\lambda$ is a wavelength, usually, of 587 nm and Fno is an effective F-number of an optical system.

On the other hand, a limit frequency $f_n$ that the CCD is reproducible as object information is expressed as the Nyquist rate of the sampling theory as follows:

$$f_n = 1/(2 \cdot k \cdot p) \quad (o)$$

where k is a coefficient in an electric system. The coefficient k is ideally k=1, but in the case where the capacity of the CCD is not optimized for the reason of electric processing, it can be defined as $$1 < k < 2 \quad (p)$$

From the Nyquist theory, the coefficient k does not exist as k<1. If 2<k, the performance of the electric system will be considerably deteriorated and thus an increase in the number of pixels is meaningless. From Equation (o) and Condition (p), the following condition is obtained:

$$1/(4 \cdot p) < f_n < 1/(2 \cdot p) \quad (q)$$

In order to utilize the highest possible image quality so that the blurring of an image caused by the diffraction limit cannot be detected even with the CCD of a large number of pixels and is not recognized as a blurring, it is necessary to satisfy the following equation:

$$f_n = f_r \quad (r)$$

This equation is modified as follows:

$$f_n = 1/(1.22 \cdot \lambda \cdot Fno) \quad (s)$$

From Condition (q) and Equation (s), $$2p/(1.22\lambda) < Fno < 4p/(1.22\lambda) \quad (10)$$

Thus, in an optical system for endoscopes corresponding to a CCD for high image quality, it is only necessary to satisfy the F-number in the magnified-object observation such as to satisfy Condition (8). In short, it is required that an optical system for nearby-object observable endoscopes corresponding to the CCD for high image quality satisfies Conditions. (7), (m), and (8).

The embodiments of the optical system of the present invention will be described below. The lens arrangements of the first to ninth embodiments of the present invention are shown in FIG. 5 to FIG. 13, respectively. In each of these figures, radii of curvature of lenses are represented by $r_1$, $r_2$, . . . and distances between lens surfaces (surface-to-surface distances) are represented by $d_1$, $d_2$, . . . . Lens data are as listed below. Also, the surface-to-surface distance changing with the object distance is described as "a surface-to-surface distance in the distant-object observation a surface-to-surface distance in the nearby-object observation".

First embodiment

| Surface No. | Radius of curvature | Surface-to-surface distance | Refractive index | Abbe's number |
|---|---|---|---|---|
| 1 | ∞ | 0.3021 | 1.88300 | 40.78 |
| 2 | 0.9265 | 0.3879 | | |
| 3 | ∞ | 0.1492 | 1.52287 | 59.89 |
| 4 | ∞ | 0.5856 ~ 0.2611 | | |
| 5 | 2.4685 | 0.3357 | 1.80100 | 34.97 |
| 6 | −2.4685 | 0.2914 | | |
| 7 | ∞ | 0.2984 | 1.51400 | 75.00 |
| 8 | ∞ (stop) | 0.3170 | | |
| 9 | ∞ | 0.3916 | 1.74400 | 44.78 |
| 10 | −0.8146 | 0.2163 ~ 0.5409 | | |
| 11 | −0.5602 | 0.2238 | 1.75520 | 27.51 |
| 12 | ∞ | 0.5595 | 1.75500 | 52.32 |
| 13 | −1.1197 | 1.2876 | | |
| 14 | ∞ (image plane) | | | |

Second embodiment

| Surface No. | Radius of curvature | Surface-to-surface distance | Refractive index | Abbe's number |
|---|---|---|---|---|
| 1 | ∞ | 0.3214 | 1.88300 | 40.78 |
| 2 | 0.8888 | 0.5016 | | |
| 3 | ∞ | 0.1592 | 1.52287 | 59.89 |
| 4 | ∞ | 0.3878 ~ 0.1892 | | |
| 5 | ∞ | 0.4776 | 1.88300 | 40.76 |
| 6 | −1.6329 | 0.6010 | | |
| 7 | ∞ | 0.2468 | 1.51400 | 75.00 |
| 8 | ∞ (stop) | 0.2399 | | |
| 9 | 6.9360 | 0.5174 | 1.75500 | 52.32 |
| 10 | −0.8236 | 0.2388 ~ 0.4321 | | |
| 11 | −0.5590 | 0.1990 | 1.78470 | 26.29 |
| 12 | ∞ | 0.5970 | 1.76200 | 40.10 |
| 13 | −1.2736 | 1.3435 | | |
| 14 | ∞ (image plane) | | | |

Third embodiment

| Surface No. | Radius of curvature | Surface-to-surface distance | Refractive index | Abbe's number |
|---|---|---|---|---|
| 1 | ∞ | 0.3232 | 1.88300 | 40.78 |
| 2 | 1.0879 | 1.7560 ~ 1.1615 | | |
| 3 | 1.8643 | 0.3887 | 1.76200 | 40.10 |
| 4 | −3.6291 | 0.4390 | | |
| 5 | ∞ (stop) | 0.3810 | | |
| 6 | 2.4647 | 0.2014 | 1.84666 | 23.78 |
| 7 | 0.9172 | 0.6585 | 1.51633 | 64.14 |
| 8 | −0.8866 | 0.1945 ~ 0.8315 | | |
| 9 | −0.8937 | 0.2593 | 1.51633 | 64.14 |
| 10 | −498.8448 | 0.4802 | | |
| 11 | 3.2015 | 1.1000 | 1.75700 | 47.82 |
| 12 | ∞ (image plane) | | | |

Fourth embodiment

| Surface No. | Radius of curvature | Surface-to-surface distance | Refractive index | Abbe's number |
|---|---|---|---|---|
| 1 | ∞ | 0.3197 | 1.88300 | 40.78 |
| 2 | 1.1746 | 1.5903 ~ 0.9025 | | |
| 3 | 1.9624 | 0.4370 | 1.84666 | 23.78 |
| 4 | −4.3711 | 0.4342 | | |
| 5 | ∞ (stop) | 0.4958 | | |
| 6 | 5.0497 | 0.2163 | 1.88300 | 40.76 |
| 7 | 0.8713 | 0.7502 | 1.76200 | 40.10 |
| 8 | −1.2267 | 0.1978 ~ 0.9297 | | |
| 9 | −1.0509 | 0.3185 | 1.88300 | 40.76 |
| 10 | −2.0576 | 0.9115 | | |
| 11 | ∞ (image plane) | | | |

Fifth embodiment

| Surface No. | Radius of curvature | Surface-to-surface distance | Refractive index | Abbe's number |
|---|---|---|---|---|
| 1 | ∞ | 0.3293 | 1.88300 | 40.78 |
| 2 | 1.1762 | 1.3374 ~ 0.7305 | | |
| 3 | 1.9023 | 0.3961 | 1.76200 | 40.10 |
| 4 | −3.6520 | 0.4473 | | |
| 5 | ∞ (stop) | 0.3359 | | |
| 6 | 6.2917 | 0.7524 | 1.75500 | 52.32 |
| 7 | −1.1695 | 0.1917 ~ 0.7986 | | |
| 8 | −0.7799 | 0.2447 | 1.75500 | 52.32 |
| 9 | −6.3073 | 0.4078 | 1.88300 | 40.76 |
| 10 | −1.8595 | 0.4078 | | |
| 11 | 4.0782 | 1.0800 | 1.75700 | 47.82 |
| 12 | ∞ (image plane) | | | |

Sixth embodiment

| Surface No. | Radius of curvature | Surface-to-surface distance | Refractive index | Abbe's number |
|---|---|---|---|---|
| 1 | ∞ | 0.3290 | 1.88300 | 40.78 |
| 2 | 1.1507 | 1.4330 ~ 0.8490 | | |
| 3 | 1.2008 | 0.3669 | 1.76200 | 40.10 |
| 4 | −11.1408 | 0.4469 | | |
| 5 | ∞ (stop) | 0.2247 | | |
| 6 | −3.2111 | 0.4263 | 1.75500 | 52.32 |
| 7 | −0.8600 | 0.2291 ~ 0.8131 | | |
| 8 | −0.8890 | 0.2445 | 1.84666 | 23.78 |

-continued

Sixth embodiment

| Surface No. | Radius of curvature | Surface-to-surface distance | Refractive index | Abbe's number |
|---|---|---|---|---|
| 9 | ∞ | 0.5297 | 1.88300 | 40.76 |
| 10 | −2.1909 | 0.4074 | | |
| 11 | 4.0745 | 0.9700 | 1.75700 | 47.82 |
| 12 | ∞ (image plane) | | | |

Seventh embodiment

| Surface No. | Radius of curvature | Surface-to-surface distance | Refractive index | Abbe's number |
|---|---|---|---|---|
| 1 | ∞ | 0.3237 | 1.88300 | 40.78 |
| 2 | 1.1931 | 1.3577 ~ 0.7942 | | |
| 3 | 1.5498 | 0.3610 | 1.76200 | 40.10 |
| 4 | −5.0764 | 0.4397 | | |
| 5 | ∞ (stop) | 0.4295 | | |
| 6 | 7.2409 | 0.4194 | 1.75500 | 52.32 |
| 7 | −1.1665 | 0.1945 ~ 0.7580 | | |
| 8 | −0.7403 | 0.2405 | 1.84666 | 23.78 |
| 9 | ∞ | 0.5212 | 1.88300 | 40.76 |
| 10 | −1.4576 | 0.4009 | | |
| 11 | 4.0091 | 1.0700 | 1.75500 | 52.32 |
| 12 | ∞ (image plane) | | | |

Eighth embodiment

| Surface No. | Radius of curvature | Surface-to-surface distance | Refractive index | Abbe's number |
|---|---|---|---|---|
| 1 | ∞ | 0.3348 | 1.88300 | 40.78 |
| 2 | 1.0268 | 0.4299 | | |
| 3 | ∞ | 0.1653 | 1.52287 | 59.89 |
| 4 | ∞ | 0.6490 ~ 0.2893 | | |
| 5 | 2.7355 | 0.3720 | 1.80100 | 34.97 |
| 6 | −2.7355 | 0.3229 | | |
| 7 | ∞ | 0.3307 | 1.51400 | 75.00 |
| 8 | ∞ (stop) | 0.3513 | | |
| 9 | ∞ | 0.4340 | 1.74400 | 44.78 |
| 10 | −0.9027 | 0.2397 ~ 05994 | | |
| 11 | −0.6649 | 0.6649 | 1.75520 | 27.51 |
| 12 | −1.2312 | 1.2596 | | |
| 13 | ∞ (image plane) | | | |

Ninth embodiment

| Surface No. | Radius of curvature | Surface-to-surface distance | Refractive index | Abbe's number |
|---|---|---|---|---|
| 1 | ∞ | 0.3043 | 1.88300 | 40.78 |
| 2 | 0.9931 | 0.4974 | | |
| 3 | ∞ | 0.3628 | 1.51400 | 75.00 |
| 4 | ∞ | 0.6987 | | |
| 5 | −3.9890 | 0.2926 | 1.84666 | 23.78 |
| 6 | 3.9890 | 0.5969 | 1.51633 | 64.14 |
| 7 | −1.4818 | 0.2048 | | |
| 8 | 3.7958 | 0.4974 | 1.69680 | 55.53 |
| 9 | −3.7958 | 0.1463 ~ 2.3000 | | |
| 10 | ∞ (stop) | 0.1364 | | |
| 11 | −2.8799 | 0.1756 | 1.69680 | 55.53 |
| 12 | 1.3343 | 0.4214 | 1.80518 | 25.42 |
| 13 | 2.6441 | 2.5200 ~ 0.3664 | | |
| 14 | ∞ | 0.8018 | 1.72916 | 54.68 |

-continued

Ninth embodiment

| Surface No. | Radius of curvature | Surface-to-surface distance | Refractive index | Abbe's number |
|---|---|---|---|---|
| 15 | −3.1328 | 0.1170 | | |
| 16 | 3.1328 | 0.8018 | 1.72916 | 54.68 |
| 17 | ∞ | 0.1908 | | |
| 18 | −8.6872 | 0.2926 | 1.84666 | 23.78 |
| 19 | 2.0893 | 1.2290 | 1.62230 | 57.05 |
| 20 | −13.0794 | 0.1112 | | |
| 21 | ∞ | 0.2341 | 1.51633 | 64.14 |
| 22 | ∞ | 2.8900 | | |
| 23 | ∞ (image plane) | | | |

Values of individual conditions are given in Table 1.

Figure 5:
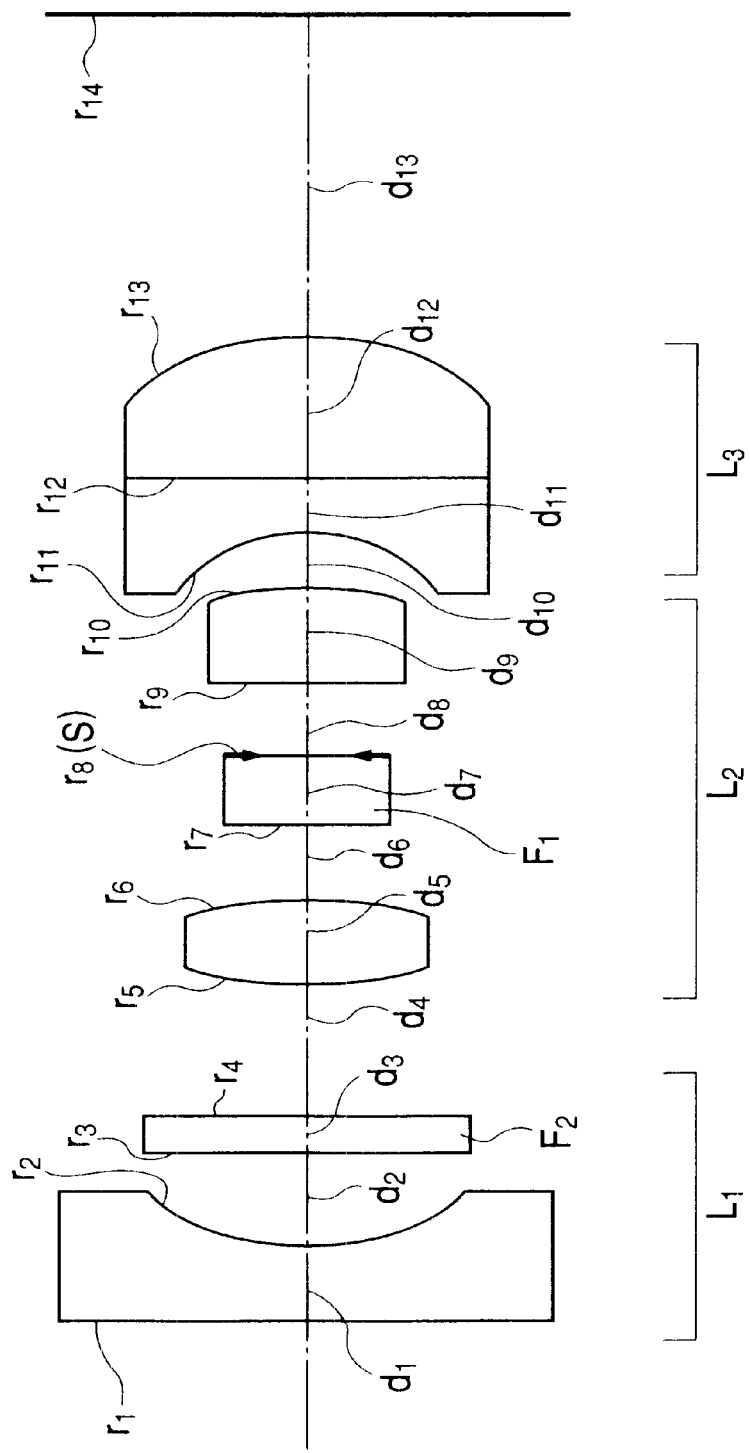
FIG. 5 is a sectional view showing the arrangement of a first embodiment of the optical system according to the present invention.

The first embodiment, as shown in FIG. 5, has the simplest arrangement so that the first diverging lens unit $L_1$ is constructed with a single negative lens and the second converging lens unit $L_2$ is constructed with two positive lenses interposing the aperture stop S between them. For the optical system for the CCD with a large number of pixels, the third diverging lens unit $L_3$ is used as a cemented lens to eliminate chromatic aberration.

Here, a plane-parallel plate $F_1$ placed in the second converging lens unit $L_2$ is a color compensating filter. In general, a CCD is highly sensitive to infrared light, and thus has the drawback that it usually reacts exceedingly to light with an infrared wavelength in observation light to impair color reproducibility. To compensate this, the color compensating filter is used. A plane-parallel plate $F_2$ placed in the first diverging lens unit $L_1$ is an interference filter, called a YAG laser cutoff filter. In an endoscope, a YAG laser for therapy is used, and a YAG laser wavelength (1064 nm) is infrared light which is strong in intensity. If such light is incident on the CCD, the difficulty is caused that it will react to the light and the entire image plane becomes white-out. In order to prevent this phenomenon, it is desirable to place the YAG laser cutoff filter. The stop S is disposed on the image-side surface of the color compensating filter.

TABLE 1

| | 1st embod. | 2nd embod. | 3rd embod. | 4th embod. | 5th embod. |
|---|---|---|---|---|---|
| Focal length of the entire system in the distant-object observation | 1.000 mm | 1.000 mm | 1.000 mm | 1.000 mm | 1.000 mm |
| Focal length of the entire system in the nearby-object observation | 1.045 mm | 0.953 mm | 1.096 mm | 1.043 mm | 1.232 mm |
| Field angle in the distant-object observation | 130.9° | 132.8° | 136.7° | 130.6° | 142.5° |
| Field angle in the nearby-object observation | 92.2° | 108.6° | 82.6° | 81.5° | 82.9° |
| Object distance in the distant-object observation | 9.000 mm | 11.940 mm | 8.004 mm | 7.918 mm | 8.156 mm |
| Object distance in the nearby-object observation | 0.800 mm | 0.796 mm | 0.800 mm | 0.792 mm | 0.816 mm |
| Pitch p of CCD | 2.5 μm | 2.5 μm | 2.5 μm | 2.5 μm | 2.5 μm |
| Max. height h3 of a ray passing through the third diverging lens unit | 0.702 mm | 0.683 mm | 0.668 mm | 0.732 mm | 0.830 mm |
| β 2T | −0.812 | −0.632 | −0.993 | −1.020 | −0.998 |
| β 2W | −0.522 | −0.472 | −0.572 | −0.564 | −0.527 |
| β 3T | 1.946 | 2.198 | 1.804 | 1.461 | 1.752 |
| \|R1/R3\| | −1.654 | −1.590 | −1.217 | −1.118 | −1.508 |
| f3/fw | −3.730 | −2.340 | −1.523 | −2.856 | −2.590 |
| 0.5 · h3 · (1/(\|r32\| + d3) − (1/\|r32\|)) | −0.210 | −0.172 | 0.182 | 0.016 | −0.075 |
| f2/fw | 1.117 | 1.176 | 1.328 | 1.606 | 1.202 |
| 2p/1.22 λ | 6.982 | 6.982 | 6.982 | 6.982 | 6.982 |
| 4p/1.22 λ | 13.964 | 13.964 | 13.964 | 13.964 | 13.964 |
| FW | 10.014 | 8.947 | 9.007 | 10.810 | 7.479 |
| FT | 11.653 | 9.774 | 10.933 | 12.929 | 9.380 |

| | 6th. embod. | 7th embod. | 8th embod. | 9th embod. |
|---|---|---|---|---|
| Focal length of the entire system in the distant-object observation | 1.000 mm | 1.000 mm | 1.000 mm | 1.000 mm |
| Focal length of the entire system in the nearby-object observation | 1.219 mm | 1.302 mm | 1.049 mm | 2.044 mm |
| Field angle in the distant-object observation | 142.9° | 142.4° | 154.7° | 131.1° |
| Field angle in the nearby-object observation | 78.3° | 84.0° | 102.2° | 35.3° |
| Object distance in the distant-object observation | 8.149 mm | 8.018 mm | 9.973 mm | 10.000 mm |
| Object distance in the nearby-object observation | 0.815 mm | 0.802 mm | 0.887 mm | 1.500 mm |
| Pitch p of CCD | 2.5 μm | 2.5 μm | 2.5 μm | 2.5 μm |
| Max. height h3 of a ray passing through the third diverging lens unit | 0.745 mm | 0.838 mm | 0.726 mm | — |
| β 2T | −1.009 | −0.975 | −0.811 | — |
| β 2W | −0.516 | −0.515 | −0.522 | — |
| β 3T | 1.813 | 1.759 | 1.755 | — |
| \|R1/R3\| | −1.294 | −1.612 | −1.137 | — |
| f3/fw | −2.349 | −3.541 | −3.869 | — |
| 0.5 · h3 · (1/(\|r32\| + d3) − (1/\|r32\|)) | −0.066 | −0.146 | −0.158 | — |
| f2/fw | 1.113 | 1.146 | 1.238 | — |
| 2p/1.22 λ | 6.982 | 6.982 | 6.982 | 6.982 |
| 4p/1.22 λ | 13.964 | 13.964 | 13.964 | 13.964 |
| FW | 10.804 | 10.718 | 9.032 | 8.146 |
| FT | 14.125 | 13.699 | 10.510 | 12.460 |

In the first embodiment, aberration curves in the distant- and nearby-object observations are shown in FIGS. 14A–14D and FIGS. 15A–15D, respectively.

The following are the third-order aberration coefficients relative to astigmatism and Petzval errors in individual lens units.

Distant-object Observation:

|  | Astigmatism | Petzval error |
|---|---|---|
| First diverging lens unit | 0.00252 | 0.01406 |
| Second converging lens unit | −0.00898 | −0.02456 |
| Third diverging lens unit | 0.00479 | 0.01066 |
| Total | −0.00167 | 0.00016 |

Nearby-object Observation:

|  | Astigmatism | Petzval error |
|---|---|---|
| First diverging lens unit | −0.00360 | 0.01208 |
| Second converging lens unit | −0.00436 | −0.02110 |
| Third diverging lens unit | 0.00711 | 0.00916 |
| Total | −0.00085 | 0.00014 |

According to these data, it is found that the astigmatism and the Petzval errors are favorably corrected by the behavior of the third diverging lens unit $L_3$.

Figure 6:
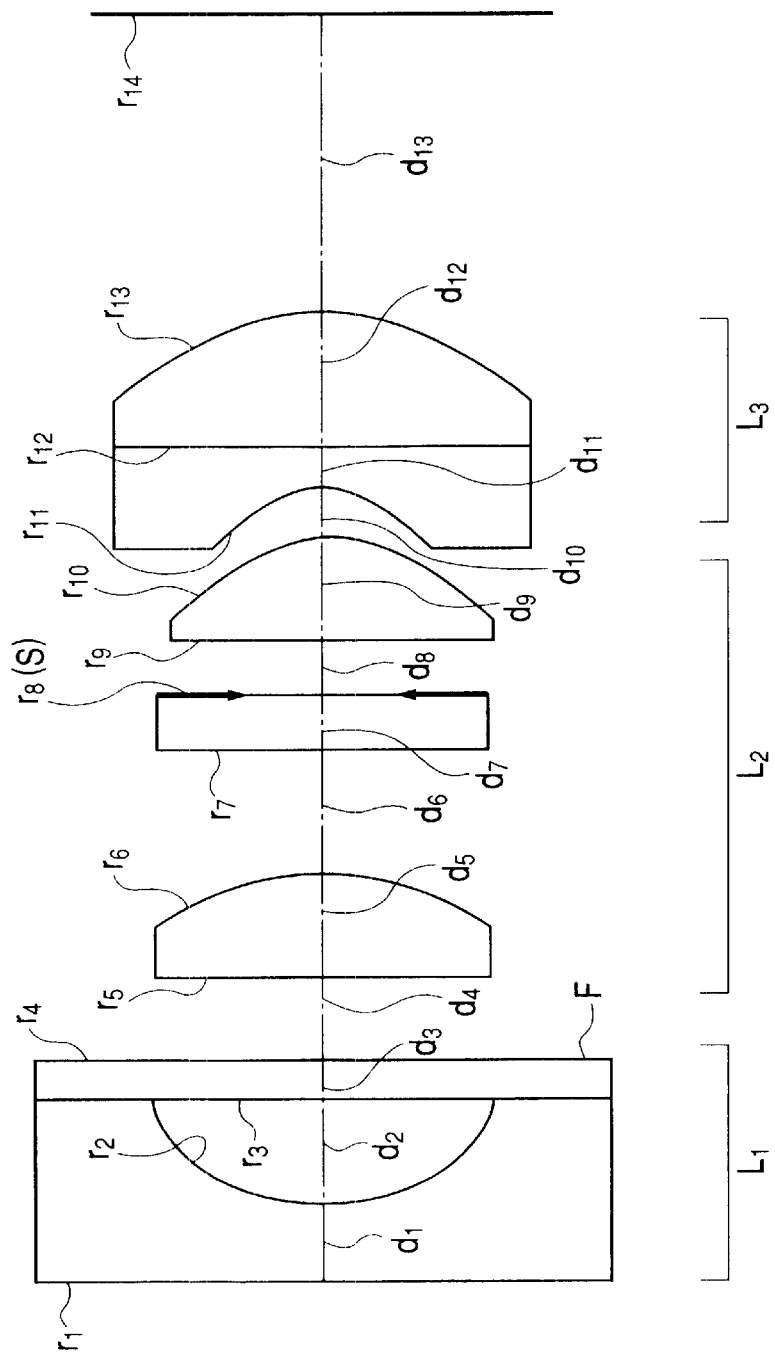
FIG. 6 is a sectional view showing the arrangement of a second embodiment of the optical system according to the present invention.

The second embodiment, as shown in FIG. 6, is such that the ray height at the first lens surface ($r_1$) is diminished and thereby the lens diameter is reduced. In order to reduce the lens diameter, rays between the first diverging lens unit $L_1$ and the second converging lens unit, $L_2$ are set to be nearly parallel. This can be realized by setting a back focal point $F_B$ of the object-side positive lens of the second converging lens unit to lie close to the aperture stop S. For example, the interference optical filter like the YAG laser cutoff filter has the problem that when a ray angle is increased, its spectral characteristics are changed and color reproducibility is impaired. However, if the ray angle between the first diverging lens unit $L_1$ and the second converging lens unit $L_2$ is moderate, an interference filter F can be placed there as in the second embodiment, and the number of degrees of design freedom is increased, which is favorable.

In the second embodiment, aberration curves in the distant- and nearby-object observations are shown in FIGS. 16A–16D and FIGS. 17A–17D, respectively.

Figure 7:
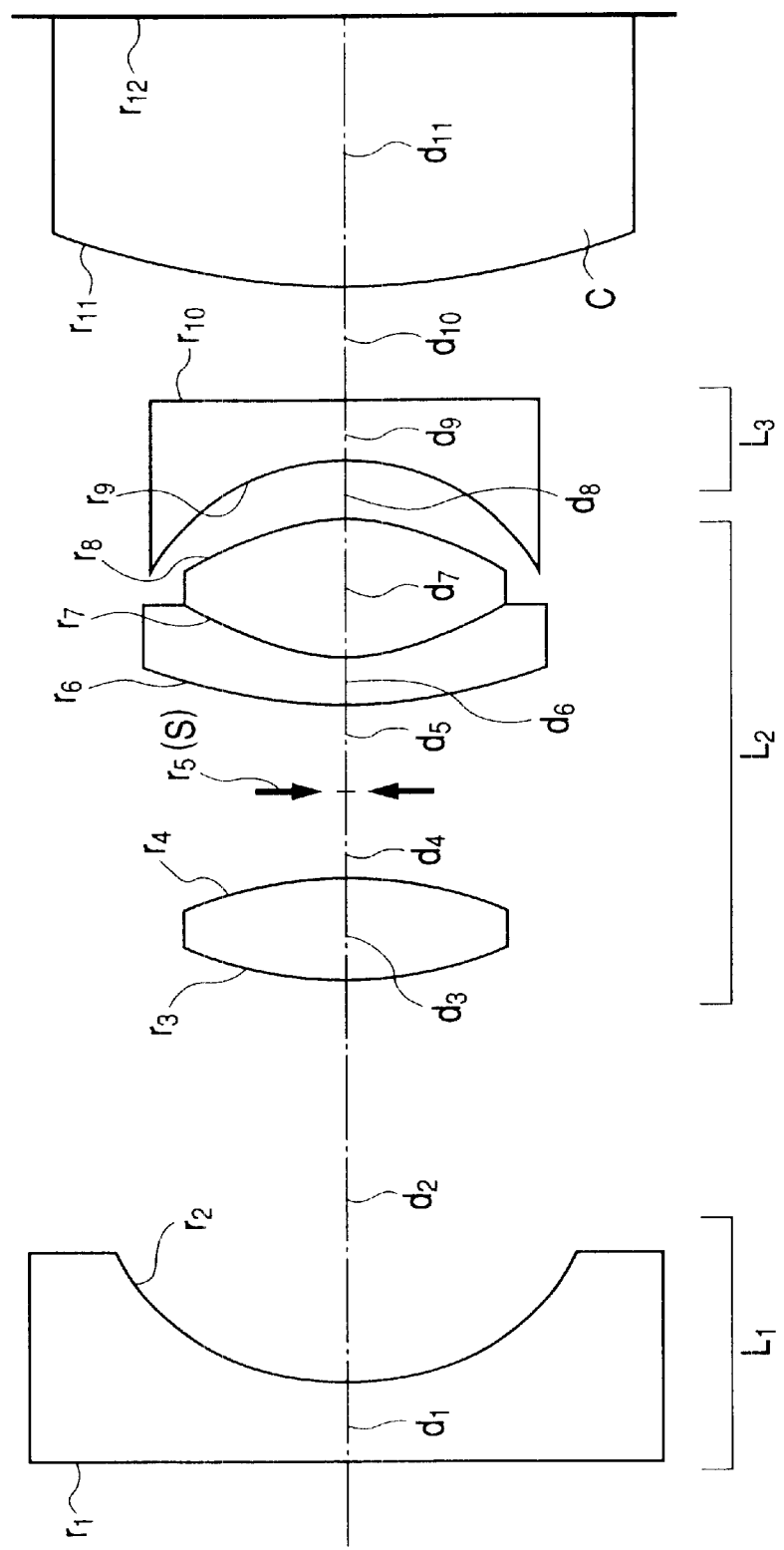
FIG. 7 is a sectional view showing the arrangement of a third embodiment of the optical system according to the present invention.

The third embodiment, as shown in FIG. 7, is designed so that a cemented lens is used in the second converging lens unit $L_2$ to suppress the production of chromatic aberration. In this embodiment, in order to make provision for preventing a phenomenon that an angle of incidence on the CCD is increased and the periphery of an image is colored, that is, a so-called shading phenomenon, a field lens C for largely shifting a pupil position is placed. In this case also, the elimination of aberration is practically governed by the first diverging lens unit $L_1$, the second converging lens unit $L_2$, and the third diverging lens unit $L_3$ before incidence on the field lens C.

In the third embodiment, aberration curves in the distant- and nearby-object observations are shown in FIGS. 18A–18D and FIGS. 19A–19D, respectively.

Figure 8:
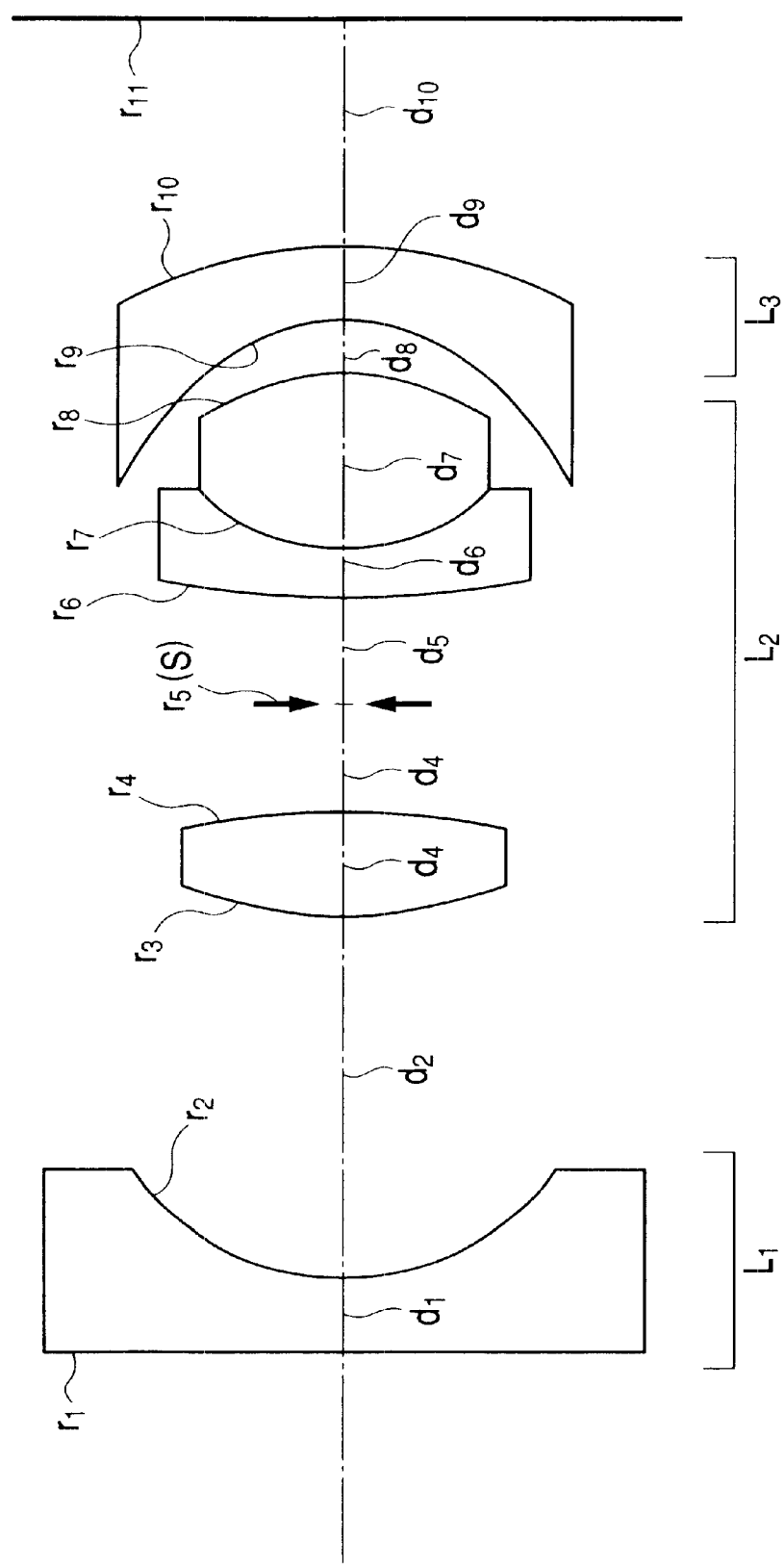
FIG. 8 is a sectional view showing the arrangement of a fourth embodiment of the optical system according to the present invention.

The fourth embodiment, as shown in FIG. 8, uses the optical system of the same type as the third embodiment with respect to a CCD in which there is no need to make provision for the shading phenomenon.

In the fourth embodiment, aberration curves in the distant- and nearby-object observations are shown in FIGS. 20A–20D and FIGS. 21A–21D, respectively.

Figure 9:
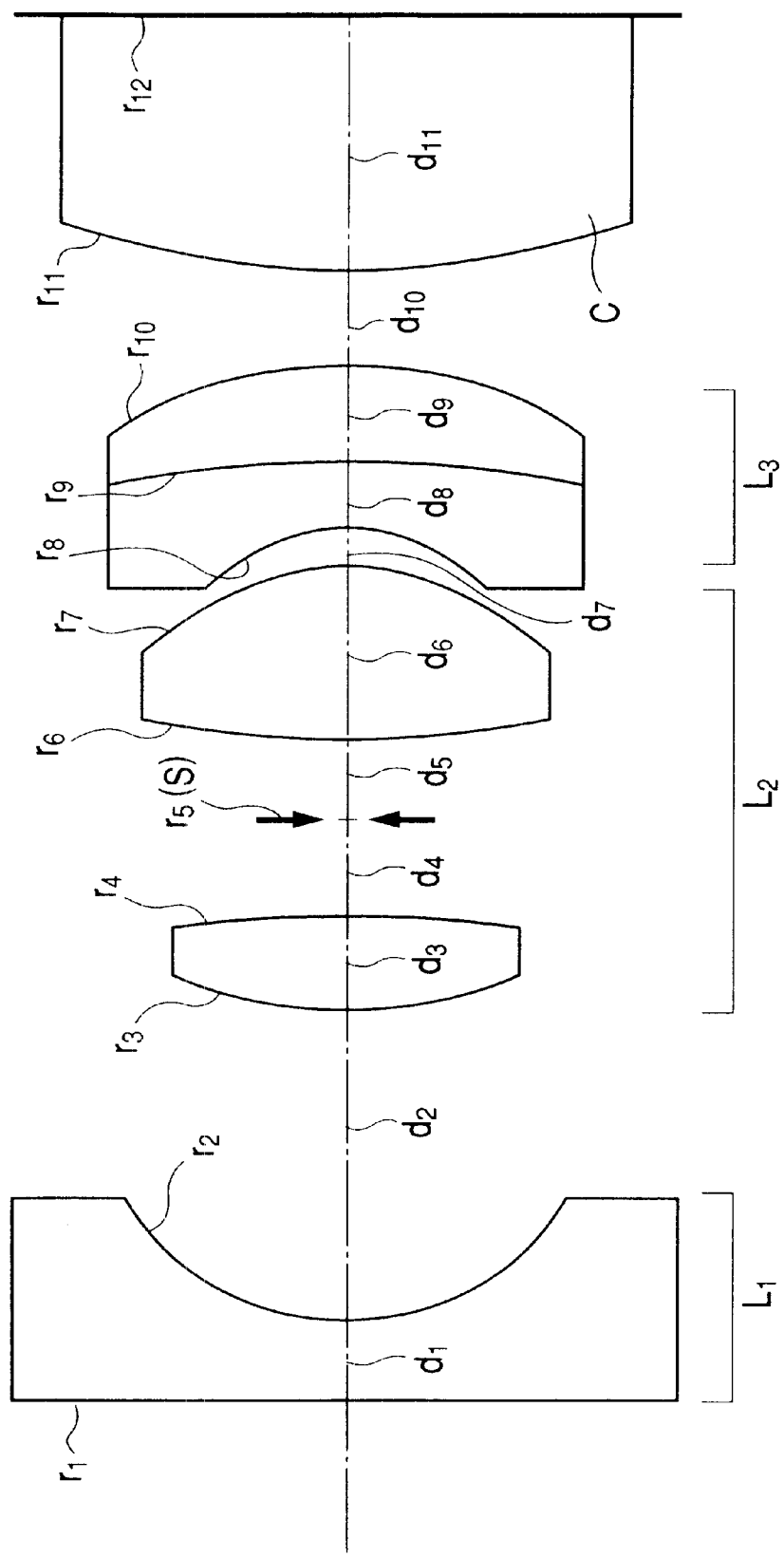
FIG. 9 is a sectional view showing the arrangement of a fifth embodiment of the optical system according to the present invention.

The fifth embodiment, as shown in FIG. 9, is such that curvatures are added to individual surfaces of the second converging lens unit $L_2$ of the optical system of the first embodiment, and thereby the production of spherical aberration is kept to a minimum.

In the fifth embodiment, aberration curves in the distant- and nearby-object observations are shown in FIGS. 22A–22D and FIGS. 23A–23D, respectively.

Figure 10:
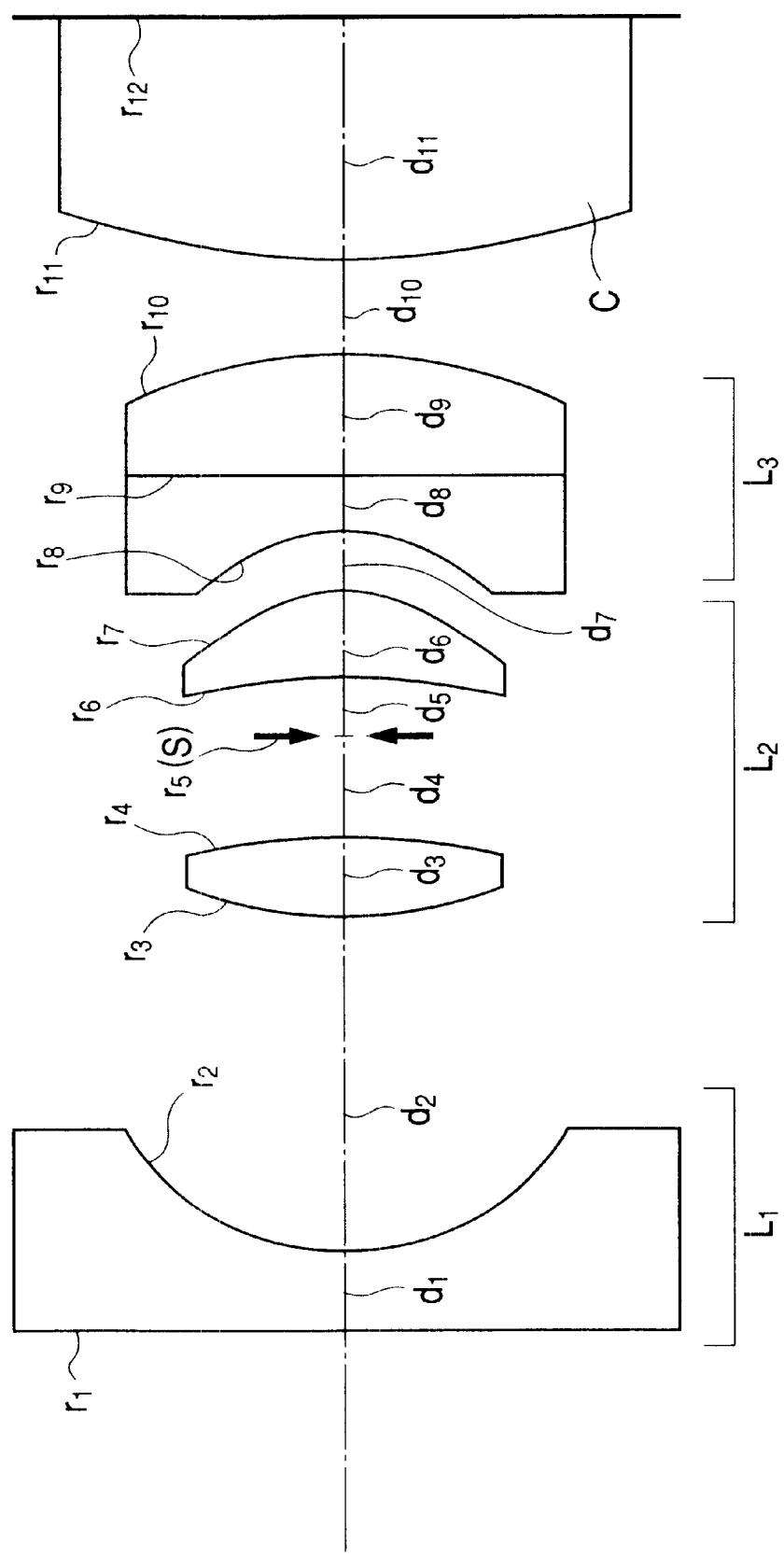
FIG. 10 is a sectional view showing the arrangement of a sixth embodiment of the optical system according to the present invention.

The sixth embodiment, as shown in FIG. 10, is designed so that, in order to reduce the length of the second converging lens unit $L_2$ as far as possible, the image-side lens of the second converging lens unit $L_2$ is shaped into a meniscus form. Although the principal point of a biconvex lens or a plano-convex lens is located at about the middle of the lens, the principal point of a meniscus lens directing a concave surface toward the object side is somewhat shifted to the image side, compared with the biconvex lens or the plano-convex lens. Hence, when the image-side lens of the second converging lens unit $L_2$ is shaped into a meniscus form, only the position of the lens can be shifted to the object side without changing the position of the principal point of the second converging lens unit $L_2$, namely the length of the second converging lens unit can be reduced.

In the sixth embodiment, aberration curves in the distant- and nearby-object observations are shown in FIGS. 24A–24D and FIGS. 25A–25D, respectively.

Figure 11:
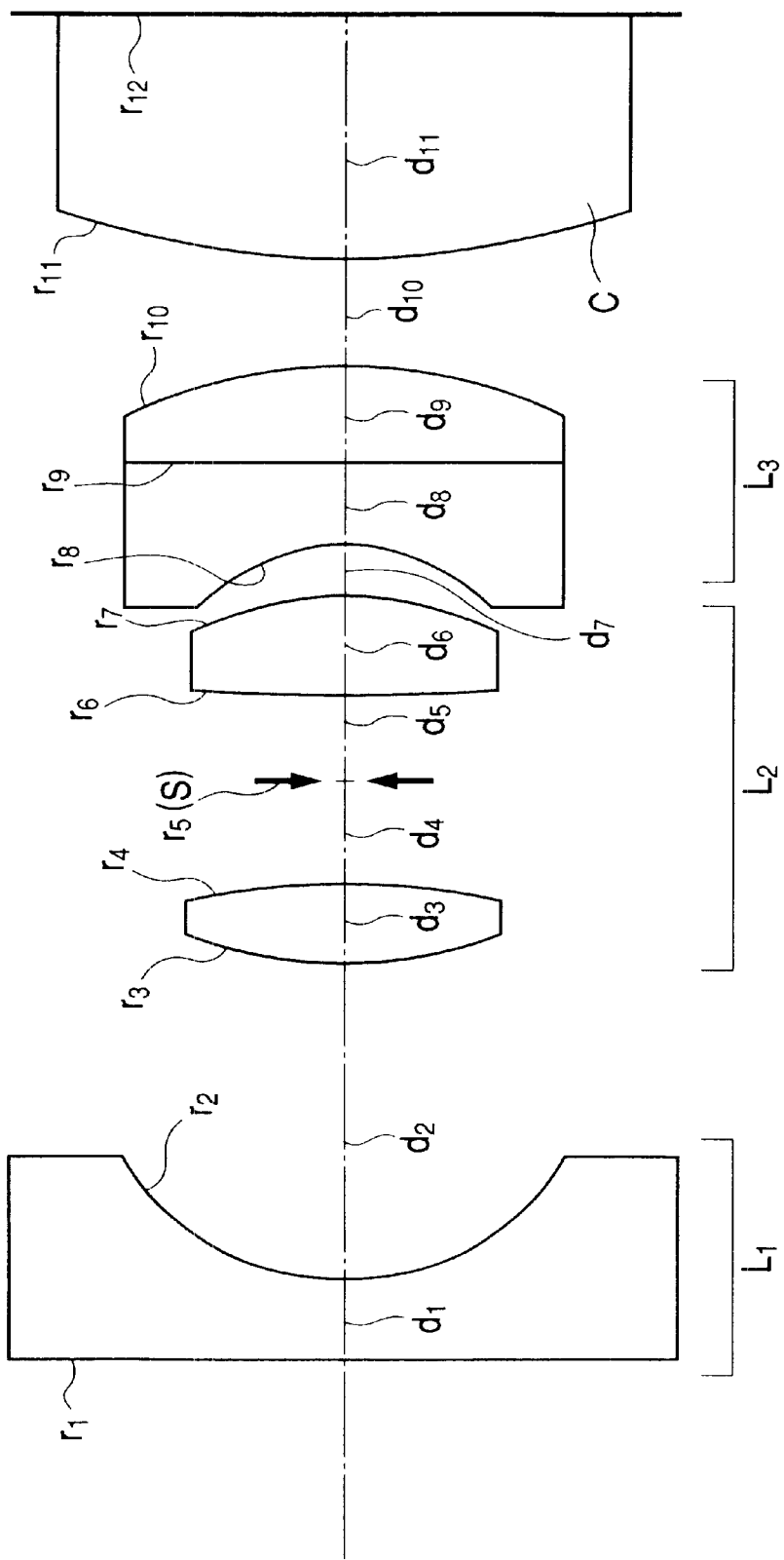
FIG. 11 is a sectional view showing the arrangement of a seventh embodiment of the optical system according to the present invention.

The seventh embodiment, as shown in FIG. 11, is constructed so that the field lens C for largely shifting the pupil position is placed in the optical system of the same type as the first embodiment.

In the seventh embodiment, aberration curves in the distant- and nearby-object observations are shown in FIGS. 26A–26D and FIGS. 27A–27D, respectively.

Figure 12:
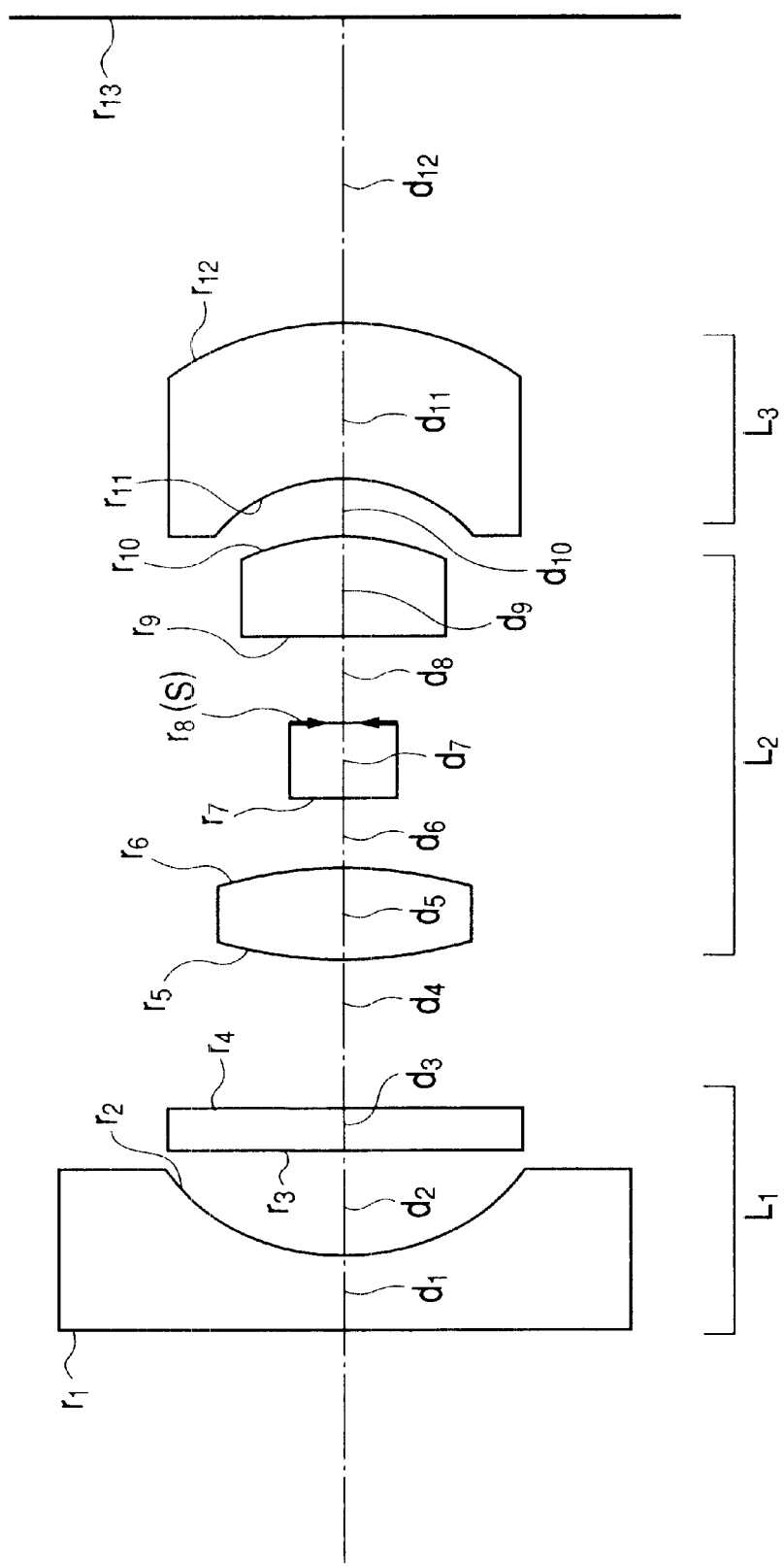
FIG. 12 is a sectional view showing the arrangement of an eighth embodiment of the optical system according to the present invention.

The eighth embodiment, as shown in FIG. 12, is such that the cemented lens in the third diverging lens unit $L_3$ of the optical system of the first embodiment is replaced with a single lens to reduce a cost, and a field angel in the distant-object observation is increased to attach weight to orientation.

In the eighth embodiment, aberration curves in the distant- and nearby-object observations are shown in FIGS. 28A–28D and FIGS. 29A–29D, respectively.

Figure 13:
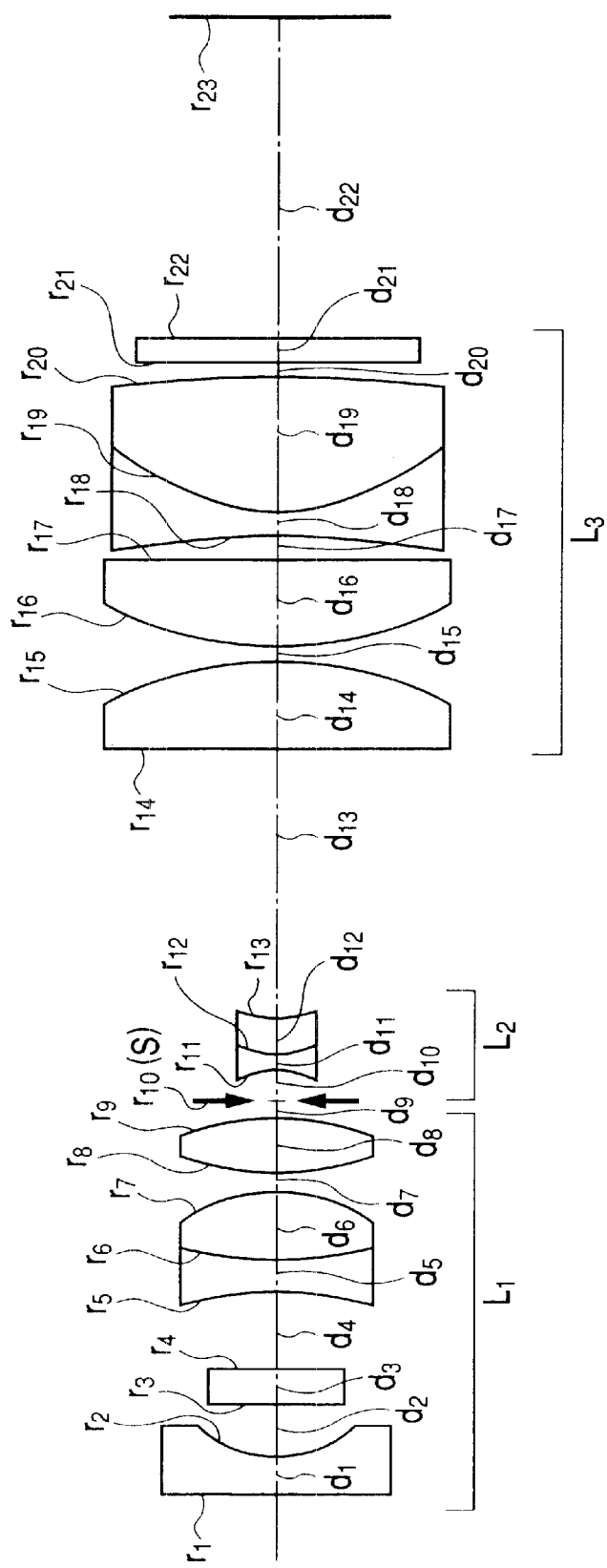
FIG. 13 is a sectional view showing the arrangement of a ninth embodiment of the optical system according to the present invention.

The arrangement of the ninth embodiment is as shown in FIG. 13.

In this embodiment, aberration curves in the distant- and nearby-object observations are shown in FIGS. 30A–30D and FIGS. 31A–31D, respectively.

The nearby-object observable endoscope so far discussed is used close to the object and thus raises the problem of flare which has never been considered.

Figure 32:
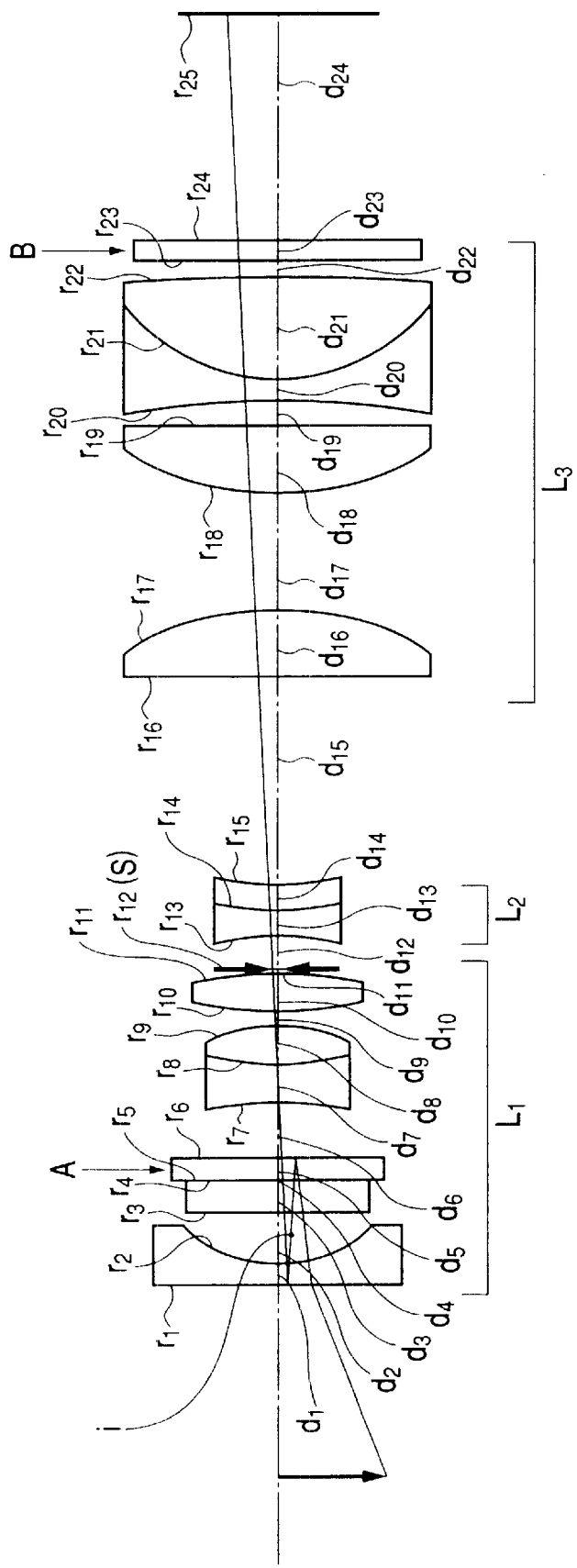
FIG. 32 is a sectional view showing the arrangement of a tenth embodiment of the optical system according to the present invention.
Figures 33A, 33B, 33C, 33D:
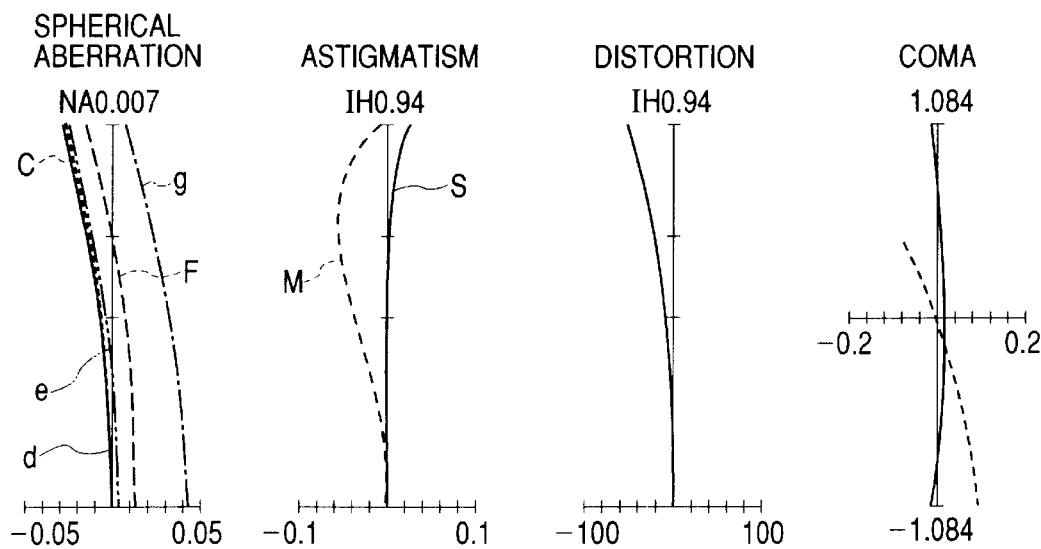
FIGS. 33A–33D and FIGS. 34A–34D are diagrams showing aberration curves of the tenth embodiment.
Figures 34A, 34B, 34C, 34D:
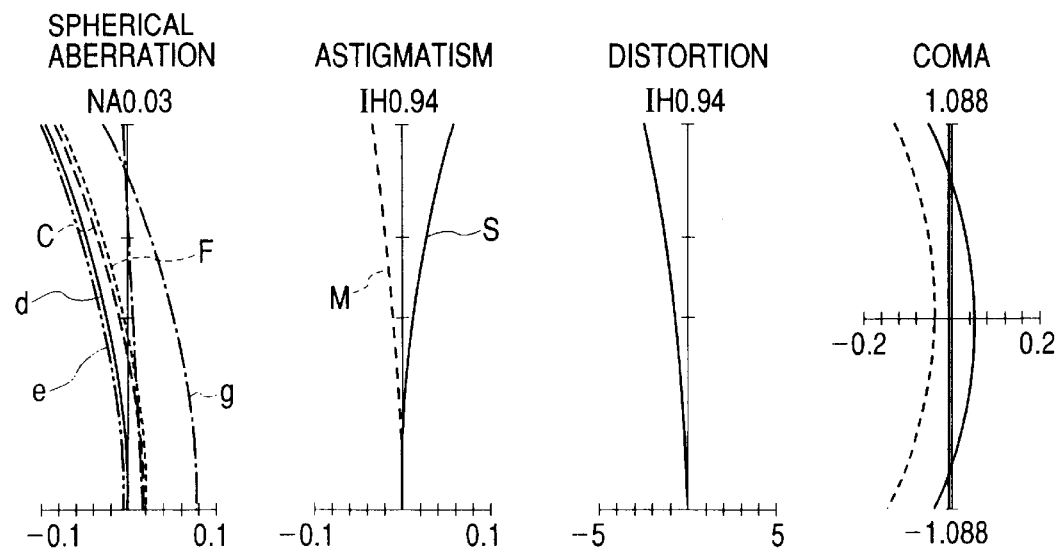

The lens arrangement of the nearby-object observable endoscope of three-lens-unit type is shown in FIG. 32. Its lens data are listed below. Also, the surface-to-surface distance changing with the object distance is described as "a surface-to-surface distance in the distant-object observation a surface-to-surface distance in the nearby-object observation".

Tenth embodiment

| Surface No. | Radius of curvature | Surface-to-surface distance | Refractive index | Abbe's number |
|---|---|---|---|---|
| 1 | ∞ | 0.3027 | 1.88300 | 40.78 |
| 2 | 0.9703 | 0.5098 | | |
| 3 | ∞ | 0.3609 | 1.51400 | 75.00 |
| 4 | ∞ | 0.0175 | | |
| 5 | ∞ | 0.2328 | 1.51633 | 64.15 |
| 6 | ∞ | 0.5254 | | |
| 7 | −3.7253 | 0.5239 | 1.84666 | 23.78 |
| 8 | 3.7253 | 0.4482 | 1.51742 | 52.43 |
| 9 | −1.5512 | 0.0882 | | |
| 10 | 2.5908 | 0.5239 | 1.51633 | 64.14 |
| 11 | −2.5908 | 0.0255 | | |
| 12 | ∞ (stop) | 0.1983 ~ 2.4116 | | |
| 13 | −2.8644 | 0.1746 | 1.69680 | 55.53 |
| 14 | 1.3271 | 0.4191 | 1.80518 | 25.42 |
| 15 | 2.6298 | 2.5899 ~ 0.3767 | | |
| 16 | ∞ | 0.7975 | 1.72916 | 54.68 |
| 17 | −3.1159 | 1.3849 | | |
| 18 | 3.1159 | 0.7975 | 1.72916 | 54.68 |
| 19 | ∞ | 0.1946 | | |
| 20 | −8.6404 | 0.2910 | 1.84666 | 23.78 |
| 21 | 2.0780 | 1.2224 | 1.62280 | 57.05 |
| 22 | −13.0090 | 0.1106 | | |
| 23 | ∞ | 0.2328 | 1.51633 | 64.1 |
| 24 | ∞ | 2.5704 | | |
| 25 | ∞ | | | |
| | (image plane) | | | |

In the tenth embodiment, aberration curves in the distant- and nearby-object observations are shown in FIGS. 33A–33D and FIGS. 34A–34D, respectively. Values of individual conditions are given in Table 2.

TABLE 2

| | 10th embod. |
|---|---|
| Focal length of the entire system in the distant-object observation | 1.000 mm |
| Focal length of the entire system in the nearby-object observation | 2.188. m |
| Field angle in the distant-object observation | 130.7° |
| Field angle in the nearby-object observation | 40.5° |
| Object distance in the distant-object observation | 8.440 mm |
| Object distance in the nearby-object observation | 1.409 mm |
| Pitch p of CCD | — |
| Max. height h3 of a ray passing through the third diverging lens unit | — |
| β 2T | — |
| β 2W | — |
| β 3T | — |
| \| R1/R3 \| | — |
| f3/fw | — |
| 0.5 · h3 · (1/(\| r32 \| + d3) − (1/\| r32 \|)) | — |
| f2/fw | — |
| 2p/1. 22λ | |
| 4p/1. 22λ | — |
| FW | 7.084 |
| FT | 18.863 |

In the endoscope, the interference filter called the YAG laser cutoff filter has been placed at a position A in FIG. 32. It is for this reason that since the interference optical filter has the problem that when the ray angle is increased, its spectral characteristics are changed and color reproducibility is impaired, it must be located at a position making as moderate a ray angle as possible. The interference filter, on the other hand, has a high reflectivity and hence is liable to produce trouble such as ghost. The surface of the first lens of the endocsope will not have a coating because surface treatment like a multicoat may be deteriorated by the effect of acid in the stomach, for instance. That is, the surface of the first lens also has a high reflectivity.

The nearby-object observable endoscope is brought into close proximity with the object, but if the interference filter is located at the position A in FIG. 32, light i reflected by the interference filter will be further reflected by the first lens surface ($r_1$) and will be imaged on the CCD. This ghost light lies at a position nearly conjugate with the object and is apparent as ghost to the eye.

In order to solve this problem, the interference filter is disposed on the image side of the variator in the optical system in which the best focus distance to the object fluctuates. For example, it is merely necessary to place the interference filter at a position B in FIG. 32. At any position on the object side of the variator, the fluctuation of the ray height is considerable, and an angle of incidence on the interference filter is changeable. When the YAG laser cutoff filter is located on the image side of the variator, it is easy to limit the angle of incidence in design, and provision can be made for ghost peculiar to the nearby-object observable endoscope.

Figure 35A:
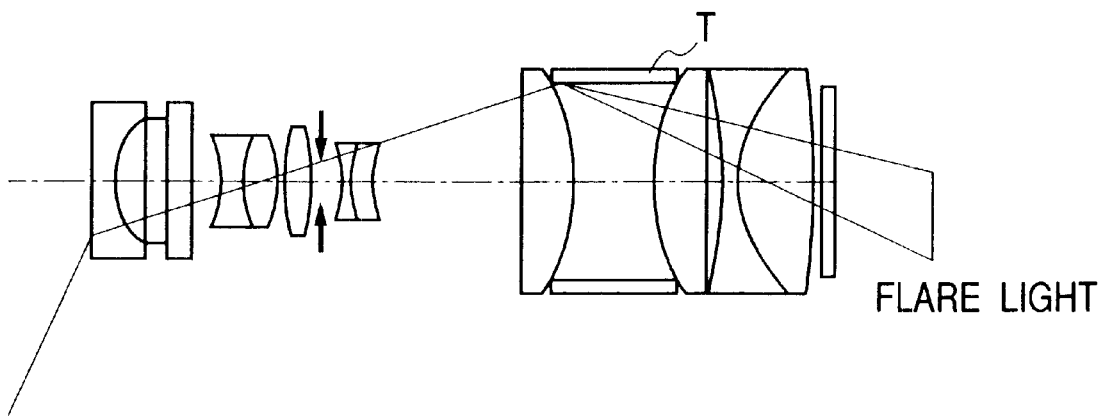
FIG. 35A and FIG. 35B are views for explaining provision for internal reflection of a spacer tube.
Figure 35B:
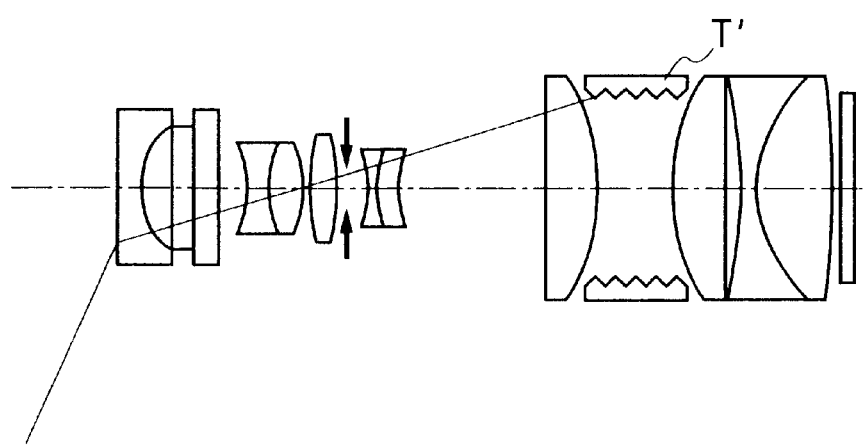

The nearby-object observable endoscope of three-lens-unit type, because of its long optical system, is liable to produce flare which is attributable to internal reflection of a spacer tube. As illustrated in FIG. 35A, when light strikes the internal surface of a spacer tube T, flare is produced at this place as a secondary light source. In order to obviate this defect, it is desirable that light-blocking work is carried out with regard to the spacer tube of the optical system of the nearby-object observable endoscope. The light-blocking work, as indicated by symbol T' in FIG. 35B, is that a plurality of grooves are provided on the internal surface of the spacer tube. By doing so, the reflectivity inside a light-blocking tube is lowered and it becomes possible to make provision for flare.

It is needless to say that this embodiment is also effective for the first to ninth embodiments. The nearby-object observable endoscope so far discussed needs a means for focus adjustment in product assembly. A common endoscope which has no magnifying function is known as a pan-focus optical system which has a large depth of field.

Figure 36:
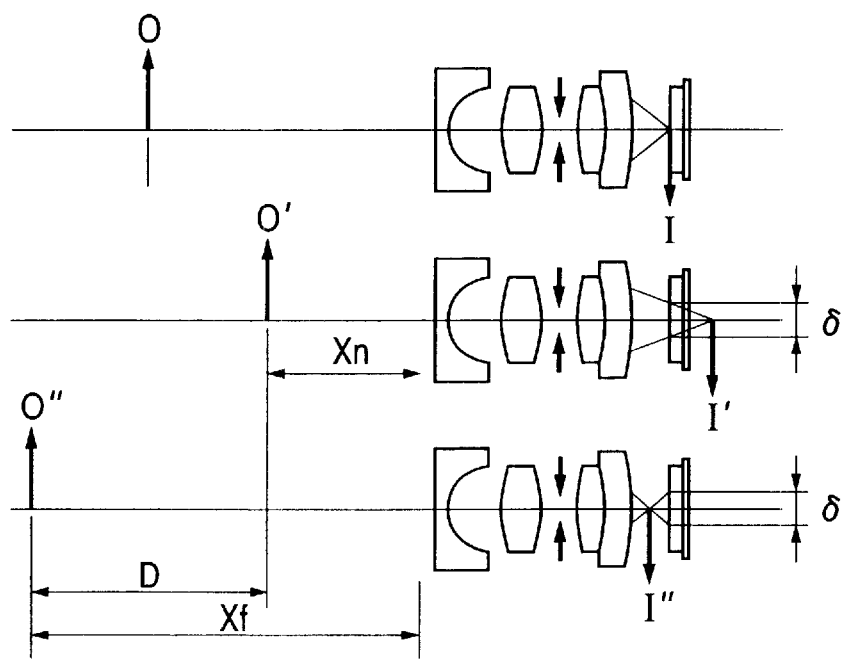
FIG. 36 is a view for explaining a depth of field.

Here, a brief description is given of the depth of field. FIG. 36 shows an optical system of an endoscope. In this figure, it is assumed that an image I is formed with respect to an object O. The CCD is placed at an image position and thereby a focused image can be obtained. If the object O is brought closer to the endoscope to lie at the position of an object O', the image position will be shifted from the position of the image I and the image will be formed at the position of an image I'. Conversely, if the object O is brought farther away to lie at the position of an object O", the image position will be shifted from the position of the image I and the image will be formed at the position of an image I".

Here, assuming that the position of the CCD remains unchanged, each of the images I' and I" at the position of the CCD becomes a circle of confusion δ, with a resultant out-of-focus image. However, when the resolution of the CCD is greater than the circle of confusion δ (the resolution of the optical system), the image is governed by the resolution of the CCD, and an image formed in the range from the object O' to the object O" appears to be focused. This range is called a depth of field.

In this case, when the effective aperture ratio of the optical system is represented by Fno and the focal length of the optical system by $f_L$, the following equation is established:

$$|1/X_n - 1/X_f| = 2\delta Fno/f_L^2 \qquad (t)$$

where $X_m$ is a distance between the near-point side of the depth of field and the lens system and $X_f$ is a distance between the far-point side of the depth of field and the lens system. Here, a depth of field D is expressed by $$D = X_f - X_n \qquad (u)$$

The endoscope has the pan-focus optical system as mentioned above and there is the need to set a desirable depth of field. In order to control variations caused by lens making, it is necessary to adjust the position of the CCD in final assembly so that a desirable depth of field is obtained. In particular, the nearby-object observable endoscope needs to be adjusted so that focusing is performed under two conditions of the distant- and nearby-object observations, and thus must use some means with respect to a conventional way.

Figure 37:
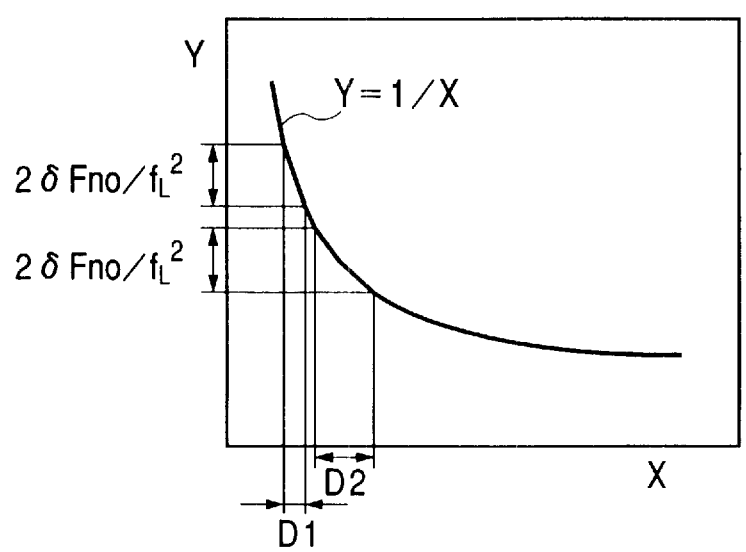
FIG. 37 is a graph for explaining the depth of field.

This means is that the focus adjustment in the nearby-object observation is made after the stage where the focus adjustment in the distant-object observation is carried out. The absolute term $|1/X_n - 1/X_f|$ in Equation (t) exhibits a magnitude in the Y direction in FIG. 37. If it is assumed that a magnitude, $2\delta \text{Fno}/f_L^2$, is constant, a depth of field $D_1$ becomes small when the distance $X_n$ is short, namely in the nearby-object observation. Conversely, when the distance $X_n$ is long, namely in the distant-object observation, a depth of field $D_2$ increases.

Here, in the focus adjustment, an error remains to a greater or less extent. Thus, if the focus adjustment in the distant-object observation is performed after the focus adjustment in the nearby-object observation, and an error remains to a greater or less extent in the nearby-object observation, this error will be enlarged in the distant-object observation to considerably deviate from the design condition.

In this way, when the focus adjustment is first made in the distant-object observation, even though some error remains in the focus adjustment, the error tends to reduce in the nearby-object observation and hence the focus adjustment can be performed with a high degree of accuracy. In this case, the focus adjustment in the distant-object observation is made by positioning the CCD, while the focus adjustment in the nearby-object observation is performed by determining the stop positions of moving lenses.

Also, if each of the embodiments mentioned above is combined with a so-called electronic zoom system in which a piece of pixel information is magnified and displayed on a TV monitor, a part to be observed will be selectively magnified and displayed and becomes easy to see. Thus, it is needless to say that a nearby-object observable endoscope which is easier in use can be obtained.

What is claimed is:

1. An optical system comprising, in order from an object side:
    a first lens unit;
    a second lens unit, said second lens unit being movable; and
    a third lens unit,
        wherein a movement of said second lens unit allows said optical system to take a position where astigmatism that is caused by said first lens unit is compensated by astigmatism that is caused by said second lens unit and a position where astigmatism that is caused by said second lens unit is compensated by astigmatism that is caused by said third lens unit.

2. An imaging optical system including an image-forming system, said image-forming system comprising, in order from an object side:
    a first diverging lens unit with a negative function;
    a second converging lens unit with a positive function; and
    a third diverging lens unit with a negative function,
        wherein said second converging lens unit is configured to be movable along an optical axis, and
        wherein said image-forming system satisfies the following conditions:

$$-1.3 < \beta_{2T} < \beta_{2W}$$

$$1 < |\beta_{3T}|$$

where $\beta_{2T}$ is a magnification of said second converging lens unit in a near-object observation mode, $\beta_{2W}$ is a magnification of said second converging lens unit in a far-object observation mode, and $\beta_{3T}$ is a magnification of said third diverging lens unit in the near-object observation mode.

3. An imaging optical system including an image-forming system, said image-forming system comprising, in order from an object side:
    a first diverging lens unit with a negative function;
    a second converging lens unit with a positive function; and
    a third diverging lens unit with a negative function,
        wherein said second converging lens unit is configured to be movable along an optical axis,
        wherein a separation between said first diverging lens unit and said third diverging lens unit is constant,
        wherein said third diverging lens unit has, at least, a concave surface directed toward said object side, and
        wherein is satisfied the following condition:

$$1 < |R_1/R_3| < 3$$

where $R_1$ is a radius of curvature of a concave surface with the smallest radius of curvature, of concave surfaces directed toward an image side in said first diverging lens unit and $R_3$ is a radius of curvature of a concave surface with the smallest radius of curvature, of concave surfaces directed toward said object side in said third diverging lens unit.

4. An imaging optical system including an image-forming system, said image-forming system comprising, in order from an object side:
    a first diverging lens unit with a negative function;
    a second converging lens unit with a positive function; and
    a third diverging lens unit with a negative function,
        wherein said second converging lens unit is configured to be movable along an optical axis, and
        wherein said image-forming system satisfies the following condition:

$$-5 < f_3/f_W < 1$$

where $f_3$ is a focal length of said third diverging lens unit and $f_W$ is a focal length of the system including said first diverging lens unit through said third diverging lens unit in a far object observation mode.

5. An imaging optical system including an image-forming system, said image-forming system comprising, in order from an object side:
    a first diverging lens unit with a negative function;
    a second converging lens unit with a positive function; and
    a third diverging lens unit with a negative function,
        wherein said second converging lens unit is configured to be movable along an optical axis, wherein a separation between said first diverging lens unit and said third diverging lens unit is constant, and wherein said second converging lens unit includes an aperture stop interposed between converging lenses.

6. An imaging optical system including an image-forming system, said image-forming system comprising, in order from an object side:

a first diverging lens unit with a negative function;

a second converging lens unit with a positive function; and a third diverging lens unit with a negative function, wherein said second converging lens unit is configured to be movable along an optical axis and includes an aperture stop interposed between converging lenses, and wherein said image-forming system satisfies the following condition:

$$0.9 < f_2/f_W < 2$$

where $f_2$ is a focal length of said second converging lens unit and $f_W$ is a focal length of the system including said first diverging lens unit through said third diverging lens unit in a far-object observation mode.

7. An optical system in which a best focus distance to an object changes, satisfying the following conditions:

$$2p/(1.22\lambda) < F_T < 4p/(1.22\lambda)$$

$$F_W < F_T$$

where $F_T$ is an effective F-number in a near object observation mode, $F_W$ is an effective F-number in a far object observation mode, p is a pixel pitch of a CCD, and $\lambda$ is a wavelength of d line rays.

8. An optical system according to claim 7, wherein an interference filter is placed on an image side of a variator.

9. An optical system comprising, in order from an object side:

a first lens unit;

a second lens unit, said second lens unit being configured to be movable; and a third lens unit, wherein a movement of said second lens unit allows said optical system to take a far-object observation position where a sign of a third-order aberration coefficient at said first lens unit is opposite to a sign of a third-order astigmatism coefficient at said second lens unit and a near-object observation position where a sign of a third-order aberration coefficient at said second lens unit is opposite to a sign of a third-order astigmatism coefficient at said third lens unit.

10. An optical system according to claim 9, wherein said first lens unit has a negative function, said second lens unit has a positive function, and said third lens unit has a negative function.

* * * * *